(12) United States Patent
Sakakura et al.

(10) Patent No.: US 7,158,310 B2
(45) Date of Patent: Jan. 2, 2007

(54) OBJECTIVE LENS SYSTEM FOR MICROSCOPE

(75) Inventors: Masahiro Sakakura, Hachiouji (JP); Yasushi Fujimoto, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/206,089

(22) Filed: Aug. 18, 2005

(65) Prior Publication Data

US 2006/0056039 A1 Mar. 16, 2006

(30) Foreign Application Priority Data

Aug. 27, 2004 (JP) .............................. 2004-247975
Aug. 27, 2004 (JP) .............................. 2004-248065

(51) Int. Cl.
*G02B 21/02* (2006.01)

(52) U.S. Cl. ....................... 359/660; 359/656; 359/661

(58) Field of Classification Search ......... 359/656–661
See application file for complete search history.

(56) References Cited

U.S. PATENT DOCUMENTS 5,191,473 A 3/1993 Kashima et al.

OTHER PUBLICATIONS

Patent Abstracts of Japan, JP 62-049313 A; Mar. 4, 1987, Olympus Optical Co Ltd.
Patent Abstracts of Japan, JP 04-026813 A; Jan. 30, 1992, Mitsutoyo Corp.
Patent Abstracts of Japan, JP 06-175034 A; Jun. 24, 1994; Olympus Optical Co Ltd.
Patent Abstracts of Japan, JP 11-174338 A; Jul. 2, 1999; Nikon Engineering: KK Nikon Corp.
Patent Abstracts of Japan, JP 2003-167199 A; Jun. 13, 2003; Mitsutoyo Corp.
Patent Abstracts of Japan, JP 05-119263 A; May 18, 1993; Olympus Optical Co Ltd.
Patent Abstracts of Japan, JP 04-159506 A; Jun. 2, 1992; Olympus Optical Co Ltd.

*Primary Examiner*—Scott J. Sugarman
*Assistant Examiner*—Darryl J. Collins
(74) *Attorney, Agent, or Firm*—Kenyon & Kenyon LLP

(57) ABSTRACT

An objective lens system for microscope which comprises first and second lens units or first through fourth lens units, and in which the second or third lens unit has a function to correct chromatic aberration within a range from a visible region to a near infrared region and aberrations are favorably corrected within the range from the visible region to the near infrared region.

11 Claims, 14 Drawing Sheets

US 7,158,310 B2

OBJECTIVE LENS SYSTEM FOR MICROSCOPE

BACKGROUND OF THE INVENTION a) Field of the Invention

The present invention relates to a lens system for microscope, and more specifically an apochromat objective lens system for microscope which has a magnification on the order of 4× to 40× and aberrations favorably corrected within a range from a visible region to a near infrared region.

b) Description of the Prior Art

In markets of research fields associated with biology, there have recently been posed requirements such as those which are described below.

First, in a market of a fluorescence observation method by which fluorescence has been observed in a near infrared region utilizing pigments which emit fluorescence having wavelengths longer than those conventionally used, there are requirements for optical systems which exhibit favorably imaging performance in the near infrared region.

Furthermore, in a field of a near infrared DIC observation method which has recently been utilized, there are requirements for favorable imaging performance in the near infrared region.

Furthermore, in a field of an observation of multiple photons typically represented by two photons in which a specimen is excited by rays having long wavelengths and the specimen is observed with visible rays, it is desired to obtain a small departure between locations of focal points on the specimen at wavelengths in the visible region and a wavelength in the near infrared region.

Moreover, in a field of a simultaneous observation by the fluorescence observation method and the near infrared DIC observation method, it is desired to obtain a small departure between locations of focal points on a specimen at the wavelengths in the visible region and the near infrared region.

For reasons described above, it is desired to obtain an apochromat objective lens system for microscope in which aberrations are favorably corrected within the range from the visible region to the near infrared region.

As objective lens systems for microscopes in which aberrations are favorably corrected within the range from the visible region to the near infrared region, there are conventionally known those which are disclosed by the following literatures:

Japanese Patent Kokai Application No. Sho 62-49313

Japanese Patent Publication No. Hei 7-104488 (Japanese Patent Kokai Application No. Hei 4-26813)

Japanese Patent Kokai Application No. Hei 6-175034

Japanese Patent Kokai Application No. Hei 11-174338

Japanese Patent Kokai Application No. 2003-167199

Out of conventional examples disclosed by the above-mentioned literatures, objective lens systems disclosed by Japanese Patent Kokai Application No. Sho 62-49313 are an objective lens system which has a magnification of 50× and an NA of 0.5, and an objective lens system which has a magnification of 60× and an NA of 0.6.

Furthermore, objective lens systems disclosed by Japanese Patent Publication No. Hei 7-104488 are an objective lens system which has a magnification of 5× and an NA of 0.14, an objective lens system which has a magnification of 10× and an NA of 0.26, an objective lens system which has a magnification of 20× and an NA of 0.4, an objective lens system which has a magnification of 50× and an NA of 0.42, and an objective lens system which has a magnification of 100× and an NA of 0.5.

Furthermore, disclosed by Japanese Patent Kokai Application No. Hei 6-175034 is an objective lens system which has a magnification of 50× and an NA of 0.45.

Furthermore, disclosed by Japanese Patent Kokai Application No. Hei 11-174338 are an objective lens system which has a magnification of 5× and an NA of 0.13, an objective lens system which has a magnification of 10× and an NA of 0.21, an objective lens system which has a magnification of 20× and an NA of 0.35, an objective lens system which has a magnification of 50× and an NA of 0.4, and an objective lens system which has a magnification of 100× and an NA of 0.5.

Moreover, disclosed by Japanese Patent Kokai Application No. 2003-167199 is an objective lens system which has a magnification of 100× and an NA of 0.7.

The objective lens systems mentioned as these conventional examples are used for observing and inspecting semiconductor integrated circuits and liquid crystal panels. These objective lens systems correct aberrations within ranges to near infrared rays for repairing wiring defects using an YAG laser (1064 nm). However, these objective lens systems which are configured to observe the semiconductor integrated circuits and the liquid crystal panels have long working distances and therefore small numerical apertures. Accordingly, these objective lens systems are unsuitable for use as objective lens systems for observation of cells, proteins, DNAs and the like which must be observed as highly resolved images and bright images.

SUMMARY OF THE INVENTION

An object of the present invention is to provide an objective lens system for microscope which has a large numerical aperture and aberrations favorably corrected within a range from the visible region to the near infrared region, in particular, to the vicinity of the t-line ($\lambda$=1013.98 nm).

An objective lens system according to the present invention which has a first composition comprises, in order from the object side, a first lens unit comprising at least a cemented lens component and a second lens unit comprising at least a cemented lens component: the cemented lens component in the first lens unit consisting of a positive lens element and a negative lens element which has a concave surface on the image side, the cemented lens component in the second lens unit consisting of a negative lens element which has a planer surface or a concave surface on the object side and a positive lens element, and the first lens unit and the second lens unit satisfying the following conditions (1) through (5):

$$\nu_d(L1p) - \nu_d(L1n) > 20 \tag{1}$$

$$\nu_d(L2p) > 75 \tag{2}$$

$$-0.007 < \{\theta Ct(L2p) - \theta Ct(L2n)\}/\{\nu_d(L2p) - \nu_d(L2n)\} < 0 \tag{3}$$

$$15 < f < 55 \tag{4}$$

$$|f(L2)|/f < 4 \tag{5}$$

wherein the reference symbol $\nu_d(L1p)$ and $\nu_d(L1n)$ represent Abbe's numbers for the d line of the positive lens element and the negative lens element which has the concave surface on the image side respectively of the cemented lens component in the first lens unit, the reference symbols $v_d(L2p)$ and $v_d(L2n)$ designate Abbe's numbers of the positive lens element and the negative lens element which has the planar surface or the concave surface on the object side of the cemented lens component in the second lens unit, the reference symbols $\theta Ct(L2p)$ and $\theta Ct(L2n)$ denote partial dispersion ratios for the t-line ($\lambda$=1013.98 nm) of the positive lens element and the negative lens element which has the planar surface or the concave surface on the object side of the cemented lens component in the second lens unit, the reference symbol f(L2) represents a focal length of the cemented lens component in the second lens unit, and the reference symbol f designates a focal length of the objective lens system as a whole.

In addition, a partial dispersion ratio $\theta Ct$ is given by the following equation:

$$\theta Ct=(nC-nt)/(nF-nC)$$

wherein the reference symbols nC, nt and nF represent refractive indices for the C-line, t-line and F-line respectively. Furthermore, the g-line, F-line, d-line, C-line, A'-line and t-line have wavelengths of 435.835 nm, 486.13 nm, 587.56 nm, 656.27 nm, 768.19 nm and 1013.98 nm respectively.

The objective lens system for microscope according to the present invention which has the first composition comprises the first lens unit and the second lens unit: the first lens unit comprising at least the cemented lens component consisting of the positive lens element and the negative lens element which has the concave surface on the image side, and the second lens unit comprising at least the cemented lens component consisting of the negative lens element which has the planar surface or the concave surface on the object side as described above.

In the objective lens system according to the present invention, the cemented lens component of the first lens unit is disposed on a front side (object side), or at a location at which heights are largely different between an upper ray and a lower ray (heights of rays change remarkably). The cemented lens component comprised in the first lens unit has a strong function to correct a longitudinal chromatic aberration. This lens component also has functions to correct aberrations such as spherical aberration, astigmatism and coma.

Furthermore, the cemented lens component of the second lens unit is disposed in a rear unit of the objective lens system, or at a location through which rays pass gently. Since the cemented lens component comprises in the second lens unit is disposed at the location through which the rays pass gently, it is possible to configure this lens component so as to reduce influences on spherical aberration, astigmatism and coma, and have a function to correct mainly the longitudinal chromatic aberration.

The objective lens system according to the present invention is therefore configured to dispose the above described cemented lens component in the first lens unit to correct mainly the longitudinal chromatic aberration in the visible region and dispose the above described cemented lens component in the second lens unit to correct the longitudinal chromatic aberration in the near infrared region (for example, from 750 nm to 1014 nm) together with the longitudinal chromatic aberration in the visible region.

Furthermore, for favorable correction of chromatic aberration in the visible region with the cemented lens component having the above described composition which is disposed in the first lens unit of the objective lens system according to the present invention, it is preferable that Abbe's numbers of the positive lens element and the negative lens element having the concave surface which compose this cemented lens component have values which are distant from each other and satisfy the above-mentioned condition (1).

If a difference between the Abbe's numbers is smaller than a lower limit of 20 of the condition (1), it will be difficult to correct chromatic aberration in the visible region.

It is possible to correct chromatic aberration more favorably when the Abbe's numbers satisfy, in place of the condition (1), the following condition (1-1):

$$v_d(L1p)-v_d(L1n)>25 \tag{1-1}$$

It is preferable that the Abbe's number of the positive lens element of the cemented lens component in the first lens unit satisfies the following condition (6):

$$v_d(L1p)>75 \tag{6}$$

When the condition (6) is satisfied, it is possible to favorably correct chromatic aberration of the d-line, C-line and F-line. Furthermore, a glass material which has an Abbe's number larger than 75 exhibits high anomalous dispersion for the g-line and can favorably correct chromatic aberration of the g-line.

If the Abbe's number of the positive lens element is smaller than a lower limit of 75 of the condition (6), chromatic aberration of the g-line in particular will not be corrected sufficiently.

Then, the cemented lens component which is comprises in the second lens unit and has the above described composition makes it possible to correct chromatic aberration in the visible region and an infrared region. The condition (2) has been adopted for correcting chromatic aberration in the visible region.

If $v_d(L2p)$ is smaller than a lower limit of 75 of the condition (2), chromatic aberration will be undercorrected in the visible region.

In addition, fluorophosphoric acid based glass, phosphoric acid-based glass, fluorite and the like are known as materials which satisfy the above-mentioned condition (2) and the condition (6).

Furthermore, the condition (3) has been adopted for correcting chromatic aberration in the near infrared region with the cemented lens component disposed in the second lens unit.

When a cemented lens component is used for correcting chromatic aberration only in the visible region, a value which is defined by the condition (3) usually has a positive value.

The objective lens system according to the present invention is configured to correct chromatic aberration in the near infrared region by adding a cemented lens component which has a negative value of $\{\theta Ct(L2p)-\theta Ct(L2n)\}/\{v_d(L2p)-v_d(L2n)\}$ defined by the condition (3) to the second lens unit.

If $\{\theta Ct(L2p)-\theta Ct(L2n)\}/\{v_d(L2p)-v_d(L2n)\}$ has a value smaller than a lower limit of −0.007 of the condition (3), chromatic aberration will be overcorrected in the near infrared region and a difference will be small between Abbe's numbers of the negative lens element and the positive lens element which compose the cemented lens component in the second lens unit, whereby chromatic aberration will not e corrected sufficiently in the visible region.

If $\{\theta Ct(L2p)-\theta Ct(L2n)\}/\{v_dCt(L2p)-v_dCt(L2n)\}$ is larger than an upper limit of 0 of the condition (3), there will be obtained an advantage for correction of chromatic aberration in the visible region, but chromatic aberration will be undercorrected in the near infrared region.

The condition (4) defines a scope of application of the objective lens system for microscope according to the present invention. In other words, the condition (4) defines a range of a magnification of the objective lens system according to the present invention. If f is smaller than a lower limit of 15 of the condition (4), the objective lens system will have too high a magnification, thereby making it difficult to dispose a cemented lens component which satisfies the condition (3) in the second lens unit. If f is larger than an upper limit of 55 of the condition (4), the objective lens system will have too low a magnification, whereby chromatic aberration will be produced in a large amount and can hardly be corrected.

The condition (5) defines refractive power of the cemented lens component which is comprised in the second lens unit and has the above described composition. If |f(L2)/f| is larger than an upper limit of 4 of the condition (5), the cemented lens component in the second lens unit will have weak refractive power, whereby the objective lens system which has a low magnification within the scope of application thereof according to the present invention will be incapable of effectively transmitting a light bundle and have an improper focal length as the objective lens system as a whole. In other words, it will be difficult to prolong a focal length (lower a magnification) of the objective lens system.

In the first lens unit and the second lens unit which compose the objective lens system according to the present invention, a lens element or a cemented lens component may be disposed in addition to the cemented lens components having the above described compositions, for example, as in embodiments described later.

It is desirable to configure the objective lens system according to the present invention which has the above described composition so that a diverging light bundle is incident on the cemented lens component which consists of the negative lens element having the planar surface or the concave surface on the object side in the second lens unit.

For enhancing freedom of chromatic aberration correction by the above described cemented lens component, it is preferable that a diverging light bundle is incident on this cemented lens component as described above. When the incident light bundle is not a diverging light bundle, it will be difficult to dispose a cemented lens component which satisfies the condition (3).

An objective lens system for microscope according to the present invention which has a second composition comprises, in order from the object side, a first lens unit which consists of a positive meniscus lens element having a concave surface on the object side, a second lens unit which comprises a plurality of cemented lens components and has positive refractive power, a third lens unit which consists of a cemented lens component and a fourth lens unit which has negative refractive power, and is characterized in that the cemented lens component of the third lens unit consists of a positive lens element and a negative lens element having a concave surface on the image side and that, and satisfies the following conditions (7) and (8):

$$v_d(L1p) > 75 \quad (7)$$

$$-0.007 < \{\theta Ct(L1p) - \theta Ct(L1n)\}/\{v_d(L1p) - v_d(L1n)\} < 0 \quad (8)$$

wherein the reference symbols $v_d(L1p)$ and $v_d(L1n)$ represent Abbe's numbers for the d-line of the positive lens element and the negative lens element having the concave surface on the image side respectively which compose the cemented lens component in the third lens unit, and the reference symbols $\theta Ct(L1p)$ and $\theta Ct(L1n)$ are partial dispersion ratios $\theta Ct$ for the t-line of the positive lens element and the negative lens element having the concave surface on the image side respectively which compose the cemented lens component in the third lens unit.

The partial dispersion ratios $\theta Ct$ are given by the following equation:

$$\theta Ct = (nC - nt)/(nF - nC)$$

wherein the reference symbols nC, nt and NF represent refractive indices for the C-line, t-line and F-line respectively. Furthermore, the g-line, F-line, d-line, C-line, A'-line and t-line have wavelengths of 435.835 nm, 486.13 nm, 587.56 nm, 656.27 nm, 768.19 nm and 1013.98 nm respectively.

The objective lens system for microscope according to the present invention which has the above described second composition comprises the four lens units. Out of the four lens units, the first lens unit has strong refractive power and a function to converge a diverging light bundle from an object, and consists of the positive meniscus lens element having a concave surface on the object side.

Furthermore, the second lens unit comprises the plurality of cemented lens components. These cemented lens components correct mainly longitudinal chromatic aberration. These cemented lens components function to correct longitudinal chromatic aberration mainly in the visible region in particular. Furthermore, the second lens unit has positive refractive power as a whole, whereby the first lens unit and the second lens unit cooperate to convert a diverging light bundle from an object into a converging light bundle.

Furthermore, the third lens unit consists of the cemented lens component which consists of the positive lens element and the negative lens element having the concave surface on the image side. This cemented lens component in the third lens unit corrects longitudinal chromatic aberration in the visible region and the near infrared region (for example, from 750 nm to 1014 nm).

For correcting chromatic aberration in the visible region with the cemented lens component in the third lens unit, it is required to select a glass material which is advantageous for correction of this aberration. The condition (7) is required for meeting this requirement.

If $v_d(L1p)$ is smaller than a lower limit of 75 of the condition (7), chromatic aberration will be undercorrected in the visible region.

Known as materials which satisfy the condition (7) are, for example, fluorophosphoric acid-based glass, phosphoric acid-based glass and fluorite.

Furthermore, the condition (8) has been adopted for correcting chromatic aberration in the near infrared region with the cemented lens component in the third lens unit. When a cemented lens component is used ordinarily for correcting chromatic aberration only in the visible region, the value defined by the condition (8) is mostly positive.

The objective lens system according to the present invention is configured to correct chromatic aberration in the near infrared region by adding a negative lens component which has a negative value defined by the condition (8) to the third lens unit.

If $\{\theta Ct(L1p) - \theta Ct(L1n)\}/\{vd(L1p) - v_d(L1n)\}$ has a value smaller than a lower limit of −0.007 of the condition (8), not only chromatic aberration will be undercorrected in the near infrared region but also a difference will be small between the Abbe's numbers of the positive lens element and the negative lens element having the concave surface on the image side which compose the cemented lens component in the third lens unit, whereby chromatic aberration cannot be corrected sufficiently in the visible region. If {θCt(L1p)−θCt(L1n)}/{$v_d$(L1p)−$v_d$(L1n)} has a value larger than an upper limit of 0 of the condition (8), in contrast, there will be obtained an advantage for correction of chromatic aberration in the visible region will be obtained but chromatic aberration will be undercorrected in the near infrared region.

Furthermore, the fourth lens unit has negative refractive power as a whole in the objective lens system according to the present invention which has the second composition. This fourth lens unit has a function to correct curvature of field and coma which are not corrected sufficiently with the first through third lens units.

Disposed in the third lens unit of the objective lens system according to the present invention which has the second composition is the cemented lens component having the function to correct chromatic aberration in a range from the visible region to the near infrared region as described above.

In other words, the cemented lens component which is disposed in the second lens unit of the objective lens system having the first composition and has the function to correct chromatic aberration within a range from the visible region to the near infrared region is disposed in the third lens unit of the objective lens system having the second composition. In the second composition, the cemented lens component in the above described third lens unit is configured to satisfy conditions which are the same as the conditions (2) and (3) which are adopted for correcting the above described chromatic aberration in the first composition. The conditions (7) and (8) are the conditions which are the same as the conditions (2) and (3).

For the objective lens system for microscope according to the present invention which has the second composition, it is desirable to further satisfy the following conditions (9), (10), (11) and (12):

$$1 < f(G1)/f < 4 \quad (9)$$

$$2.5 < f < 5.5 \quad (10)$$

$$v_{d,ave}(G2p) - v_{d,ave}(G2n) > 25 \quad (11)$$

$$v_{d,ave}(G2p) > 75 \quad (12)$$

wherein the reference symbol f(G1) represents a focal length of the first lens unit, the reference symbol f designates a focal length of the objective lens system as a whole, the reference symbols $v_{d,ave}(G2p)$ and $v_{d,ave}(G2n)$ denote of an average value of Abbe's numbers for the d-line of positive lens elements composing the cemented lens components in the second lens unit and an average value of Abbe's numbers the d-line of negative lens elements composing the cemented lens components in the second lens unit respectively.

The condition (9) defined refractive power of the first lens unit in the objective lens system according to the present invention which has the second composition. If refractive power of the first lens unit is insufficient, rays will be too high on the lens units disposed after the first lens unit, thereby allowing aberrations to be produced in larger amounts by rear units. The condition (9) has been adopted for this reason.

If f(G1)/f has a value larger than an upper limit of 4 of the condition (9) the first lens unit will have weak refractive power, whereby rays will be high on the rear unit and aberrations will be produced in large amounts by the rear units. If f(G1)/f has a value smaller than a lower limit of 1 of the condition (9), in contrast, the first lens unit will have too strong refractive power, thereby producing aberrations in larger amounts.

The condition (10) defines a scope of application of the objective lens system according to the present invention. In other words, the condition (10) defines a focal length of the objective lens system according to the present invention which has the second composition as a whole, or a range of a focal length of the objective lens system.

If f has a value smaller than a lower limit of 2.5 of the condition (10), the objective lens system will have too high a magnification, whereby the objective lens system cannot meet user's requirements when the lens system is a dry type objective lens system. If f has a value larger than an upper limit of 5.5 of the condition (19), in contrast, the objective lens system will have too low a magnification and can hardly be configured as the objective lens system according to the present invention which has the second composition.

When refractive power of the first lens unit is to be strengthened as described above, it is preferable to use a glass material having a high refractive index for the lens element to be disposed in the first lens unit. However, a glass material which has a high refractive index is highly dispersive (has a small Abbe's number) and apt to produce longitudinal chromatic aberration.

It is necessary to adjust a correction amount of chromatic aberration in the second lens unit in conjunction with longitudinal chromatic aberration produced in the first lens unit.

For the reason described above, the conditions (11) and (12) have been adopted for effective correction of longitudinal chromatic aberration in the second lens unit.

For correction of chromatic aberration in the visible region, it is desirable to use a positive lens element and a negative lens element whose Abbe's numbers have values separated from each other. In other words, it is desirable to reserve a large difference between Abbe's numbers of these two lens elements.

If $v_{d,ave}(G2p) - v_{d,ave}(G2n)$ has a value smaller than a lower limit of 25 of the condition (11), a difference will be small between Abbe's numbers of a positive lens element and a negative lens element, thereby making it difficult to correct chromatic aberration in the visible region. When the condition (12) is satisfied, it is possible to favorably correct chromatic aberration of the d-line, C-line and F-line. Furthermore, a glass material which has an Abbe's number larger than 75 exhibits a high anomalous dispersion property for the g-line and is capable of favorably correcting chromatic aberration also of the g-line.

When lateral chromatic aberration is to be corrected independently in the objective lens system which has the second composition for use the objective lens system in a compensation-free type microscope system, it is desirable that a fourth lens unit comprises at least a positive lens element. It is desirable that this positive lens element satisfies the following condition (13):

$$v_d(G4p) < 50 \quad (13)$$

This condition (13) is required for correcting lateral chromatic aberration in the objective lens system and, if $v_d(G4p)$ is larger than an upper limit of 50 of the condition (13), it will be difficult to correct lateral chromatic aberration in the objective lens system as a whole.

It is needless to say that the condition (13) may not be satisfied when the objective lens system according to the present invention is to be used in a compensation type microscope system.

The objective lens system according to the present invention is configured to favorably correct longitudinal chromatic aberration within a range from the visible region to the near infrared region as described above and has a composition usable even in the compensation free type microscope system. In a case where the objective lens system according to the present invention is to be used in a compensation type microscope system, it is preferable the lens system so as to satisfy the condition (13).

An optical microscope or an optical observation apparatus which is equipped with the above described objective lens system according to the present invention permits observing bright images of specimens with high resolution, thereby being effective for observation of cells and others.

DETAILED DESCRIPTION OF THE PREFERRED EMBODIMENTS

Now, description will be made of preferred embodiments of the objective lens system according to the present invention.

Figure 1:
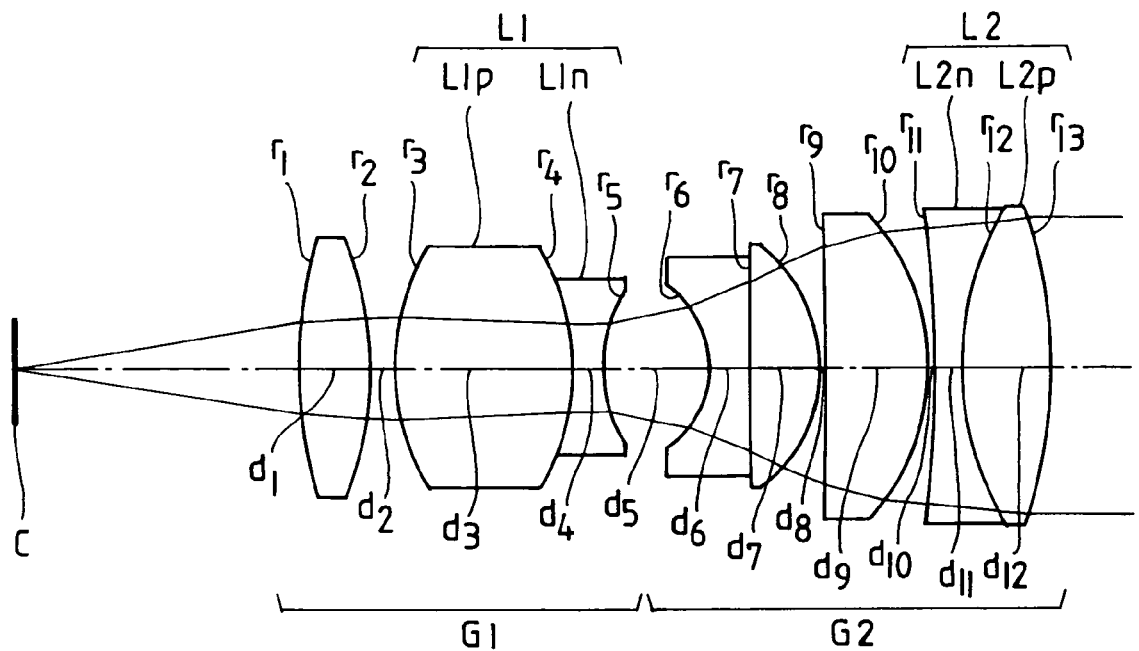
FIG. 1 is a sectional view showing a composition of an objective lens system according to a first embodiment of the present invention.

A first embodiment of the present invention provides an objective lens system which has a first composition in shown FIG. 1. Speaking concretely, the objective lens system according to the first embodiment comprises a first lens unit G1 and a second lens unit G2 in order from the object side: the first lens unit G1 consisting, in order from the object side, of a positive lens element ($r_1$ to $r_2$) and a cemented lens component L1 ($r_3$ to $r_5$) which consists of a positive lens element L1$p$ ($r_3$ to $r_4$) and a negative lens element L1$n$ ($r_4$ to $r_5$) having a concave surface on the image side. Furthermore, the second lens unit G2 consists, in order from the object side, of a cemented lens component ($r_6$ to $r_8$) which consists of a negative lens element ($r_6$ to $r_7$) and a positive lens element ($r_7$ to $r_8$), a positive lens element ($r_9$ to $r_{10}$), and a cemented lens component L2 ($r_{11}$ to $r_{13}$) which consists of a negative lens element L2$n$ ($r_{11}$ to $r_{12}$) having a concave surface on the object side and a positive lens element L2$p$ ($r_{12}$ to $r_{13}$).

The first embodiment has numerical data listed below:

f = 45, β = 4x, NA = 0.16, field number = 26.5, WD = 13.327

| | | | |
|---|---|---|---|
| $r_1$ = 23.5100 | $d_1$ = 3.3114 | $n_1$ = 1.51633 | $v_1$ = 64.14 |
| $r_2$ = −18.0816 | $d_2$ = 1.1909 | | |
| $r_3$ = 11.9099 | $d_3$ = 8.3841 | $n_2$ = 1.49700 | $v_2$ = 81.54 |
| $r_4$ = −11.4327 | $d_4$ = 1.4037 | $n_3$ = 1.74100 | $v_3$ = 52.64 |
| $r_5$ = 7.6802 | $d_5$ = 4.9712 | | |
| $r_6$ = −4.8583 | $d_6$ = 1.8582 | $n_4$ = 1.77250 | $v_4$ = 49.60 |
| $r_7$ = 511.8307 | $d_7$ = 3.2971 | $n_5$ = 1.43875 | $v_5$ = 94.93 |
| $r_8$ = −7.5362 | $d_8$ = 0.2307 | | |
| $r_9$ = −269.1995 | $d_9$ = 4.7695 | $n_6$ = 1.49700 | $v_6$ = 81.54 |
| $r_{10}$ = −11.3589 | $d_{10}$ = 0.3500 | | |
| $r_{11}$ = −56.7065 | $d_{11}$ = 1.2469 | $n_7$ = 1.48749 | $v_7$ = 70.23 |
| $r_{12}$ = 15.5159 | $d_{12}$ = 4.2171 | $n_8$ = 1.49700 | $v_8$ = 81.54 |
| $r_{13}$ = −24.9502 | | | |

$v_d$(L1p) = 81.54
$v_d$(L1n) = 52.64
$v_d$(L2p) = 81.54
$v_d$(L2n) = 70.23
θCt(L2p) = 0.8258
θCt(L2n) = 0.8924
f(L2) = 79.799
f = 45
(1) $v_d$(L1p) − $v_d$(L1n) = 28.9
(2) $v_d$(L2p) = 81.54
(3) {θCt(L2p) − θCt(L2n)}/{$v_d$(L2p) − $v_d$(L2n)} = −0.0059
(4) f = 45
(5) |f(L2)/f| = 1.77
(6) $v_d$(L1p) = 81.54 wherein the reference symbols $r_1$, $r_2$, . . . represent radii of curvature on surfaces of respective lens elements, the reference symbols $d_1$, $d_2$, . . . designate thicknesses of the respective lens element and airspaces reserved therebetween, the reference symbols $n_1$, $n_2$, . . . denote refractive indices of the respective lens elements for the d-line, and the reference symbols $v_1$, $v_2$, . . . represent Abbe's numbers of the respective lens elements. In the numerical data, lengths are specified in a unit of millimeter. In addition, the reference symbol f represents a focal length, the reference symbol β designates a magnification, the reference symbol NA denotes a numerical aperture and the reference symbol WD represents a working distance.

A glass material used for the first embodiment is excellent in transmittance in an ultraviolet region and emits little auto-fluorescence. The objective lens system according to the first embodiment is optimum for observing fluorescence.

Figure 2:
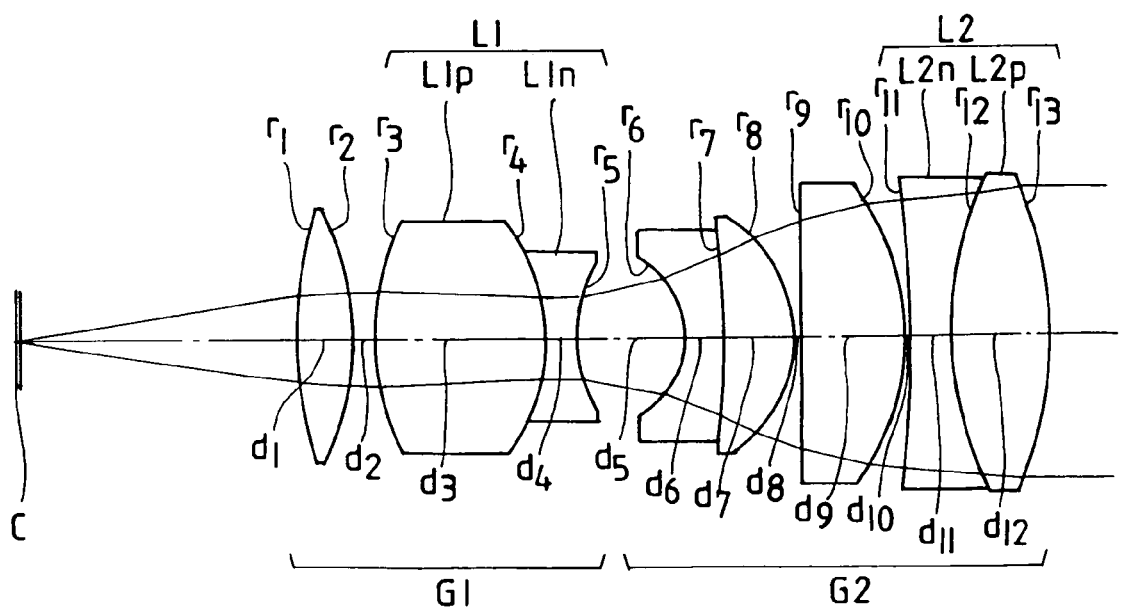
FIG. 2 is a sectional view showing a composition of an objective lens system according to a second embodiment of the present invention.

An objective lens system according to a second embodiment has the first composition shown in FIG. 2. Speaking concretely, this objective lens system consists of a first lens unit G1 and a second lens unit G2. The first lens unit G1 consists, in order from the object side, of a positive lens element ($r_1$ or $r_2$), and a cemented lens component L1 ($r_3$ to $r_5$) which consists of a positive lens element Lp1 ($r_3$ to $r_4$) and a negative lens element L1n ($r_4$ to $r_5$) having a concave surface on the image side. Furthermore, the second lens unit G2 consists, in order from the object side, of a cemented lens component ($r_6$ to $r_8$) which consists of a negative lens element ($r_6$ to $r_7$) and a positive lens element ($r_7$ to $r_8$), a positive lens element ($r_9$ to $r_{10}$), and a cemented lens component L2 ($r_{11}$ to $r_{13}$) which consists of a negative lens element L2n ($r_{11}$ to $r_{12}$) having a concave surface on the object side and a positive lens element L2p ($r_{12}$ to $r_{13}$).

The second embodiment also uses a glass material which is excellent in transmittance in the ultraviolet region and emits little auto-fluorescence, and has a composition preferable for observation of fluorescence.

The second embodiment has numerical data which is listed below:

| f = 45, β = 4x, NA = 0.16, field number = 26.5, WD = 13.128 | | | |
|---|---|---|---|
| $r_1$ = 22.0338 | $d_1$ = 2.5851 | $n_1$ = 1.51633 | $v_1$ = 64.14 |
| $r_2$ = −16.3327 | $d_2$ = 1.0057 | | |
| $r_3$ = 13.2301 | $d_3$ = 8.0333 | $n_2$ = 1.49700 | $v_2$ = 81.54 |
| $r_4$ = −10.6413 | $d_4$ = 1.4762 | $n_3$ = 1.74100 | $v_3$ = 52.64 |
| $r_5$ = 7.7218 | $d_5$ = 5.0902 | | |
| $r_6$ = −4.6759 | $d_6$ = 1.7801 | $n_4$ = 1.74100 | $v_4$ = 52.64 |
| $r_7$ = −48.9050 | $d_7$ = 3.3001 | $n_5$ = 1.43875 | $v_5$ = 94.93 |
| $r_8$ = −7.3261 | $d_8$ = 0.3451 | | |
| $r_9$ = ∞ | $d_9$ = 4.8401 | $n_6$ = 1.49700 | $v_6$ = 81.54 |
| $r_{10}$ = −12.9154 | $d_{10}$ = 0.2325 | | |
| $r_{11}$ = −69.4925 | $d_{11}$ = 1.8817 | $n_7$ = 1.48749 | $v_7$ = 70.23 |
| $r_{12}$ = 18.2063 | $d_{12}$ = 4.6804 | $n_8$ = 1.43875 | $v_8$ = 94.93 |
| $r_{13}$ = −20.2479 | | | |

$v_d$(L1p) = 81.54
$v_d$(L1n) = 52.64
$v_d$(L2p) = 94.93
$v_d$(L2n) = 70.23
θCt(L2p) = 0.8373
θCt(L2n) = 0.8924
f(L2) = 77.941
f = 45
(1) $v_d$(L1p) − $v_d$(L1n) = 28.9
(2) $v_d$(L2p) = 94.93
(3) {θCt(L2p) − θCt(L2n)}/{$v_d$(L2p) − $v_d$(L2n)} = −0.0022
(4) f = 45
(5) |f(L2)/f| = 1.73
(6) $v_d$(L1p) = 81.54

Figure 3:
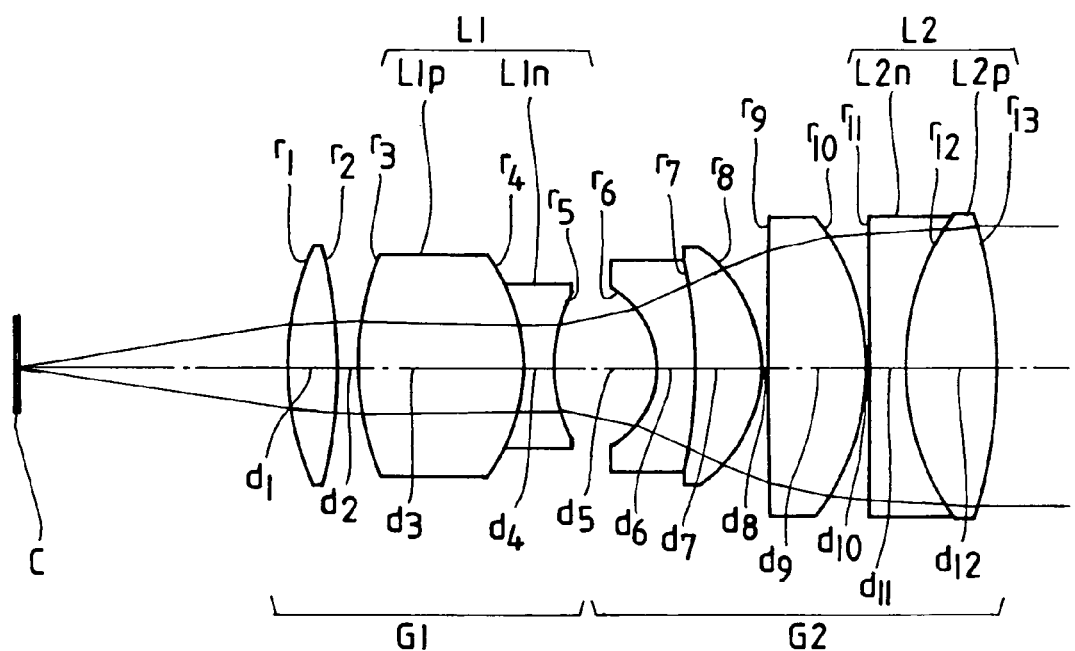
FIG. 3 is a sectional view showing a composition of an objective lens system according to a third embodiment of the present invention.

A third embodiment provides an objective lens system for microscope which has the first composition shown in FIG. 3, and consists of a first lens unit G1 and a second lens unit G2.

In the third embodiment, the first lens unit G1 consists, consists, in order from the object side, of a positive lens element ($r_1$ to $r_2$), and a cemented lens component L1 ($r_3$ to $r_5$) which consists of a positive lens element L1p ($r_3$ to $r_4$) and a negative lens element L1n ($r_4$ to $r_5$) having a concave surface on the image side. Furthermore, The second lens unit consists, in order from the object side, of a cemented lens component ($r_6$ to $r_8$) which consist of a negative lens element ($r_6$ to $r_7$) and a positive lens element ($r_7$ to $r_8$), a positive lens element ($r_9$ to $r_{10}$), and a cemented lens component L2 ($r_{11}$ to $r_{13}$) which consists of a negative lens element L2n ($r_{11}$ to $r_{12}$) having a planar surface on the object side and a positive lens element L2p ($r_{12}$ to $r_{13}$).

The third embodiment has numerical data which is listed below:

| f = 18, β = 4x, NA = 0.16, field number = 26.5, WD = 13.074 | | | |
|---|---|---|---|
| $r_1$ = 15.4116 | $d_1$ = 2.4262 | $n_1$ = 1.51633 | $v_1$ = 64.14 |
| $r_2$ = −24.8478 | $d_2$ = 0.9700 | | |
| $r_3$ = 15.3969 | $d_3$ = 8.0632 | $n_2$ = 1.49700 | $v_2$ = 81.54 |
| $r_4$ = −9.7470 | $d_4$ = 1.4344 | $n_3$ = 1.74100 | $v_3$ = 52.64 |
| $r_5$ = 8.4888 | $d_5$ = 5.0716 | | |
| $r_6$ = −4.7470 | $d_6$ = 1.7813 | $n_4$ = 1.74100 | $v_4$ = 52.64 |
| $r_7$ = −29.6562 | $d_7$ = 3.2984 | $n_5$ = 1.43875 | $v_5$ = 94.93 |
| $r_8$ = −7.6436 | $d_8$ = 0.3428 | | |
| $r_9$ = 807.1999 | $d_9$ = 4.8337 | $n_6$ = 1.49700 | $v_6$ = 81.54 |
| $r_{10}$ = −12.8532 | $d_{10}$ = 0.1456 | | |
| $r_{11}$ = ∞ | $d_{11}$ = 1.7263 | $n_7$ = 1.48749 | $v_7$ = 70.23 |
| $r_{12}$ = 13.7643 | $d_{12}$ = 4.5524 | $n_8$ = 1.43875 | $v_8$ = 94.93 |
| $r_{13}$ = −27.2037 | | | |

$v_d$(L1p) = 81.54
$v_d$(L1n) = 52.64
$v_d$(L2p) = 94.93
$v_d$(L2n) = 70.23
θCt(L2p) = 0.8373
θCt(L2n) = 0.8924
f(L2) = 78.321
f = 45
(1) $v_d$(L1p) − $v_d$(L1n) = 28.9
(2) $v_d$(L2p) = 94.93
(3) {θCt(L2p) − θCt(L2n)}/{$v_d$(L2p) − $v_d$(L2n)} = −0.0022
(4) f = 45
(5) |f(L2)/f| = 1.74
(6) $v_d$(L1p) = 81.54

The objective lens system for microscope according to the third embodiment is also made of a glass material which is excellent in transmittance in the ultraviolet region and emits little auto-fluorescence, and has a composition optimum for observing fluorescence.

Figure 4:
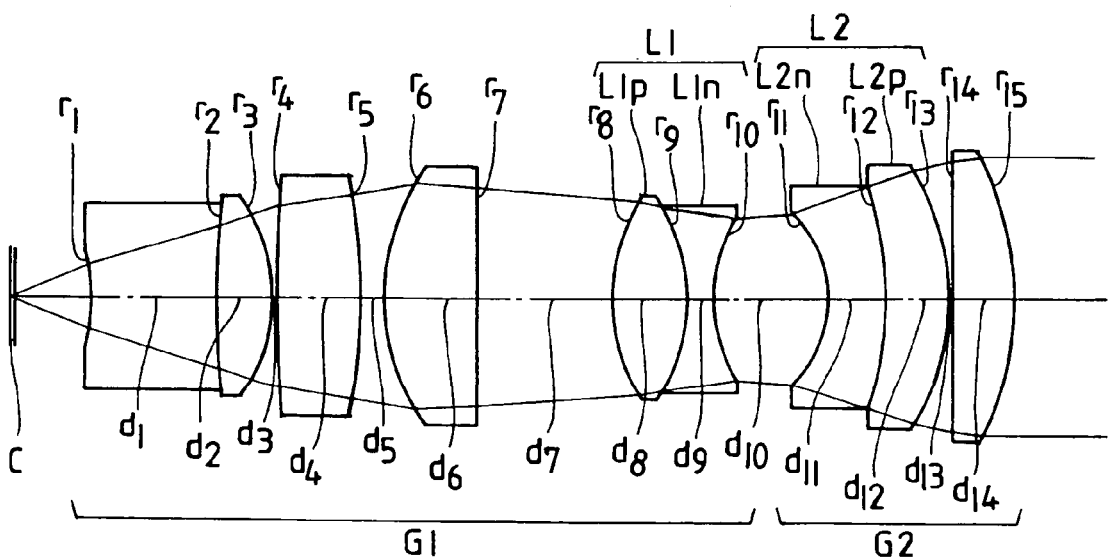
FIG. 4 is a sectional view showing a composition of an objective lens system according to a fourth embodiment of the present invention.

An objective lens system according to a fourth embodiment of the present invention has the first composition shown in FIG. 4, and consists of a first lens unit G1 and a second lens unit G2. The first lens unit G1 consists, in order from the object side, of a cemented lens component ($r_1$ to $r_3$) which consists of a negative lens element ($r_1$ to $r_2$) and a positive lens element ($r_2$ to $r_3$), a positive lens element ($r_4$ to $r_5$), a positive lens element ($r_6$ to $r_7$), and a cemented lens component L1 ($r_8$ to $r_{10}$) which consists of a positive lens element LP1 ($r_8$ to $r_9$) and a negative lens element L1n ($r_9$ to $r_{10}$) having a concave surface on the image side. Furthermore, the second lens unit G2 consists, in order from the object side, of a cemented lens component L2 ($r_{11}$ to $r_{13}$) which consists of a negative lens element L2n ($r_{11}$ to $r_{12}$) having a concave surface on the object side and a positive lens element L2p ($r_{12}$ to $r_{13}$), and a positive lens element ($r_{14}$ to $r_{15}$).

The fourth embodiment has numerical data listed below:

| f = 18, β = 10x, NA = 0.4, field number = 26.5, WD = 3.8 | | | |
|---|---|---|---|
| $r_1$ = −10.0179 | $d_1$ = 6.0670 | $n_1$ = 1.67300 | $v_1$ = 38.15 |
| $r_2$ = 55.2737 | $d_2$ = 2.7505 | $n_2$ = 1.49700 | $v_2$ = 81.54 |

-continued

| f = 18, β = 10x, NA = 0.4, field number = 26.5, WD = 3.8 | | | |
|---|---|---|---|
| $r_3 = -9.2112$ | $d_3 = 0.2125$ | | |
| $r_4 = 83.9358$ | $d_4 = 4.0793$ | $n_3 = 1.56907$ | $\nu_3 = 71.30$ |
| $r_5 = -35.6271$ | $d_5 = 1.1100$ | | |
| $r_6 = 11.8739$ | $d_6 = 4.5781$ | $n_4 = 1.43875$ | $\nu_4 = 94.93$ |
| $r_7 = \infty$ | $d_7 = 6.5068$ | | |
| $r_8 = 10.2087$ | $d_8 = 3.6739$ | $n_5 = 1.43875$ | $\nu_5 = 94.93$ |
| $r_9 = -9.8106$ | $d_9 = 1.2763$ | $n_6 = 1.55836$ | $\nu_6 = 54.01$ |
| $r_{10} = 8.2650$ | $d_{10} = 5.6402$ | | |
| $r_{11} = -6.3912$ | $d_{11} = 2.7687$ | $n_7 = 1.48749$ | $\nu_7 = 70.23$ |
| $r_{12} = -19.9601$ | $d_{12} = 3.2167$ | $n_8 = 1.49700$ | $\nu_8 = 81.54$ |
| $r_{13} = -12.7726$ | $d_{13} = 0.1300$ | | |
| $r_{14} = \infty$ | | | |
| $r_{14} = 3.0324$ | $n_9 = 1.49700$ | $\nu_9 = 81.54$ | |
| $r_{15} = -16.8356$ | | | |

$\nu_d(L1p) = 94.93$
$\nu_d(L1n) = 54.01$
$\nu_d(L2p) = 81.54$
$\nu_d(L2n) = 70.23$
$\theta Ct(L2p) = 0.8258$
$\theta Ct(L2n) = 0.8924$
$f(L2) = -38.52$
$f = 18$
(1) $\nu_d(L1p) - \nu_d(L1n) = 40.92$
(2) $\nu_d(L2p) = 81.54$
(3) $\{\theta Ct(L2p) - \theta Ct(L2n)\}/\{\nu_d(L2p) - \nu_d(L2n)\} = -0.0059$
(4) $f = 18$
(5) $|f(L2)/f| = 2.14$
(6) $\nu_d(L1p) = 94.93$ The objective lens system according to the fourth embodiment is also made of a glass material which is characterized by excellent transmittance in the ultraviolet region and little omission of auto-fluorescence, and has a composition optimum for fluorescence observation.

Figure 5:
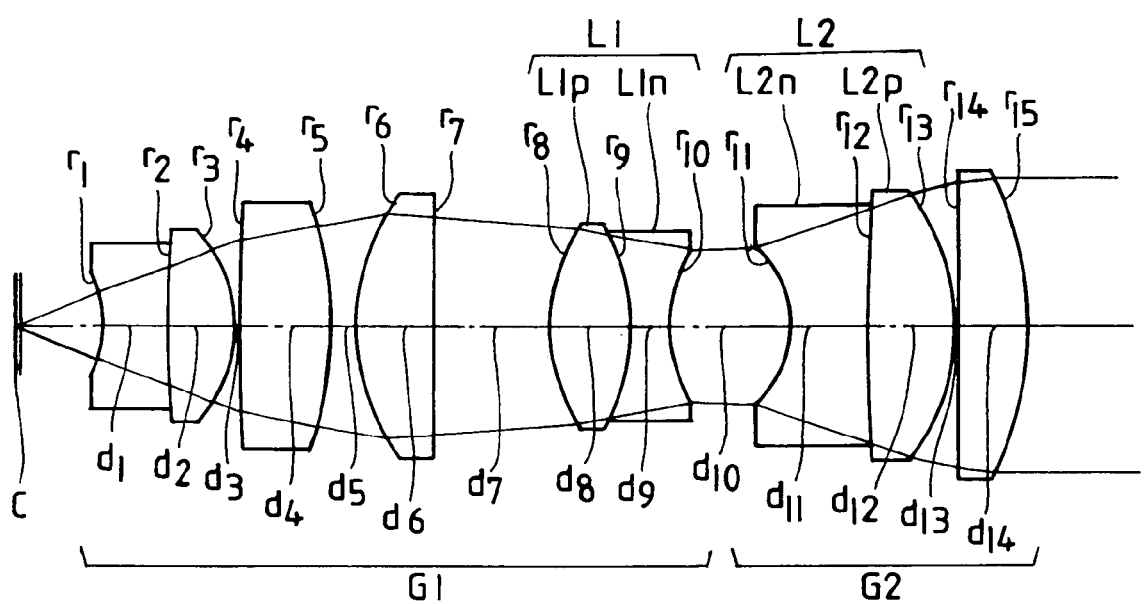
FIG. 5 is a sectional view showing a composition of an objective lens system according to a fifth embodiment of the present invention.
Figure 6:
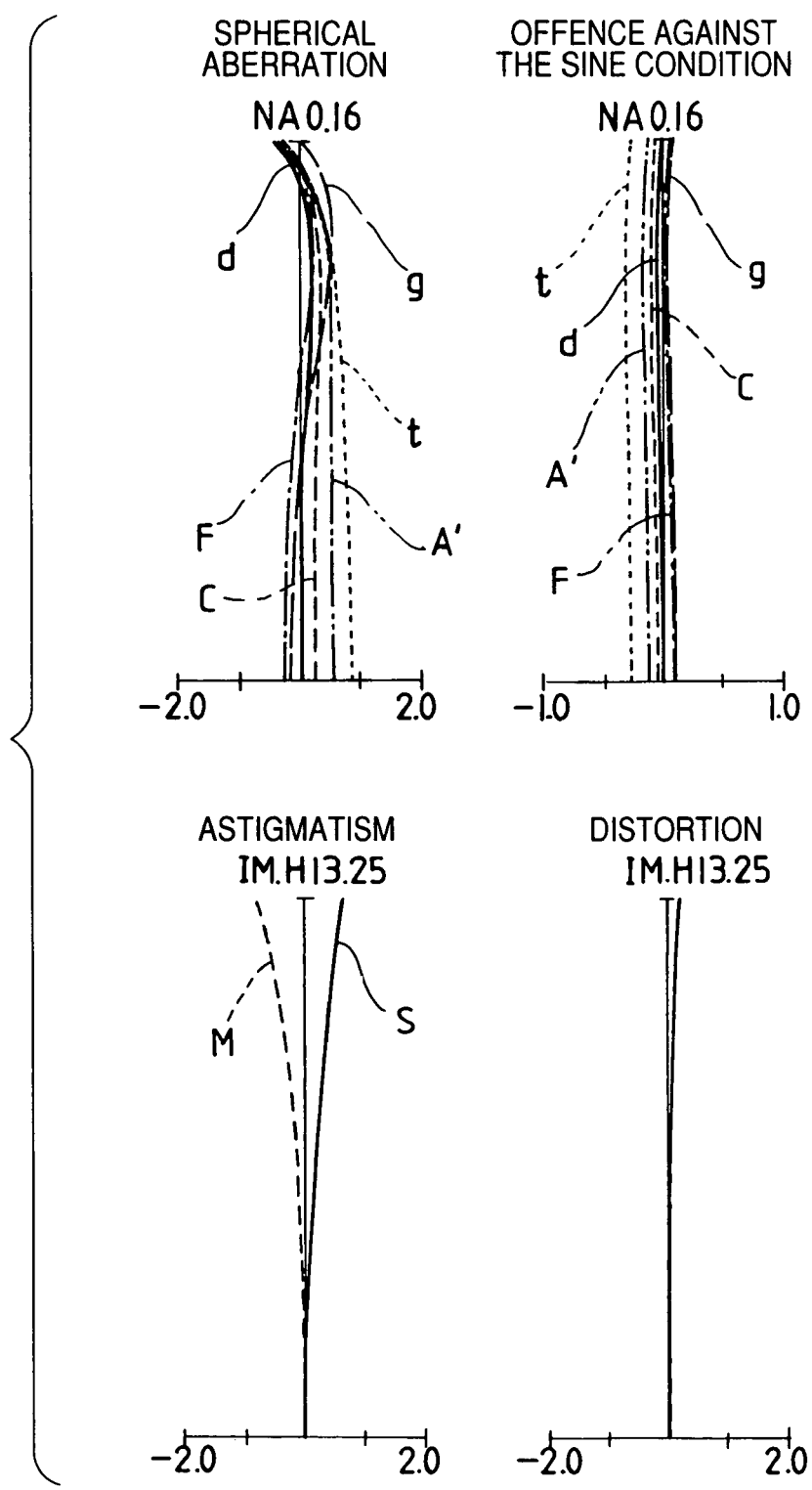
FIG. 6 is a diagram showing aberration curves of the first embodiment of the present invention.
Figure 7:
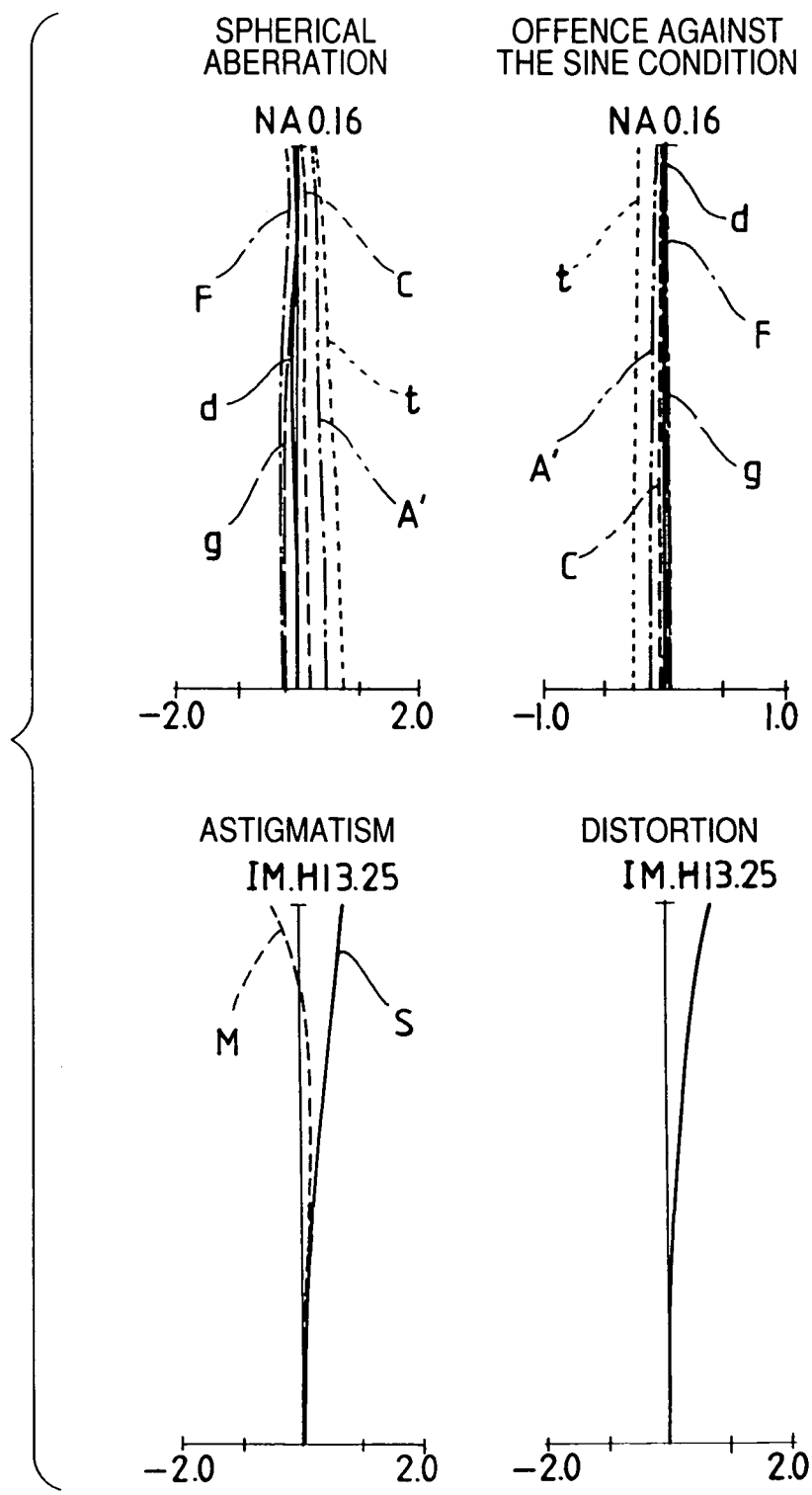
FIG. 7 is a diagram showing aberration curves of the second embodiment of the present invention.
Figure 8:
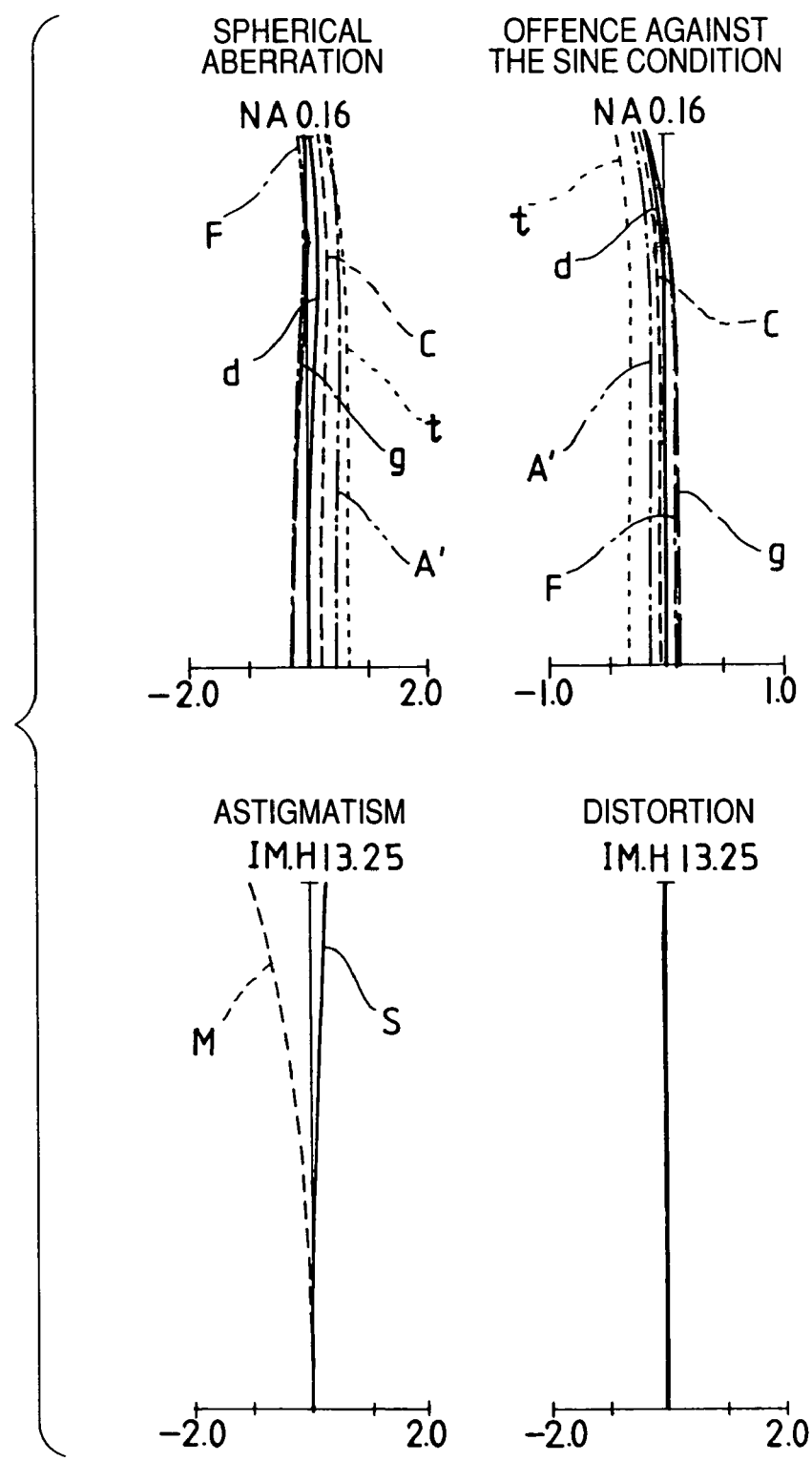
FIG. 8 is a diagram showing aberration curves of the third embodiment of the present invention.
Figure 9:
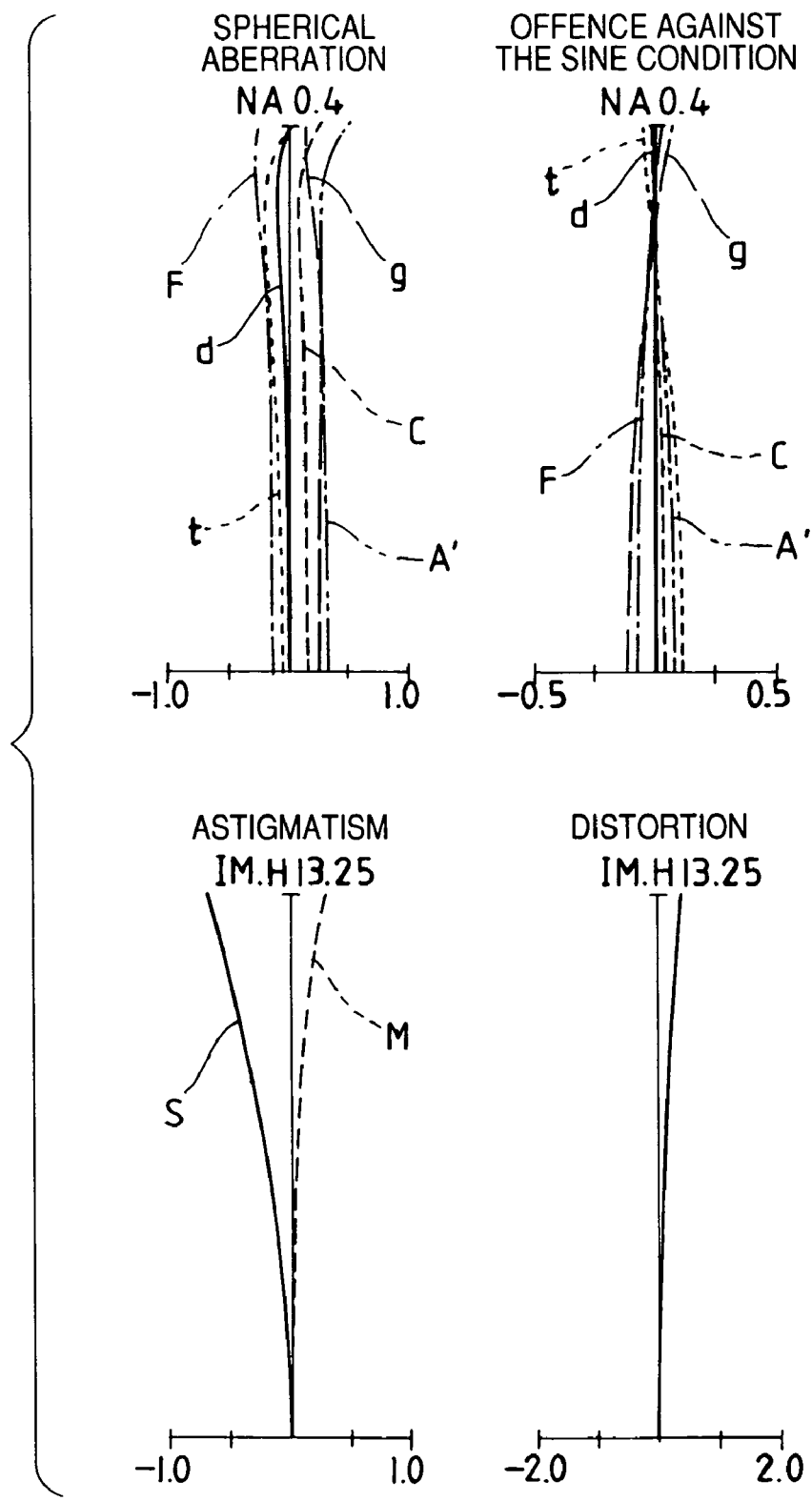
FIG. 9 is a diagram showing aberration curves of the fourth embodiment of the present invention.
Figure 10:
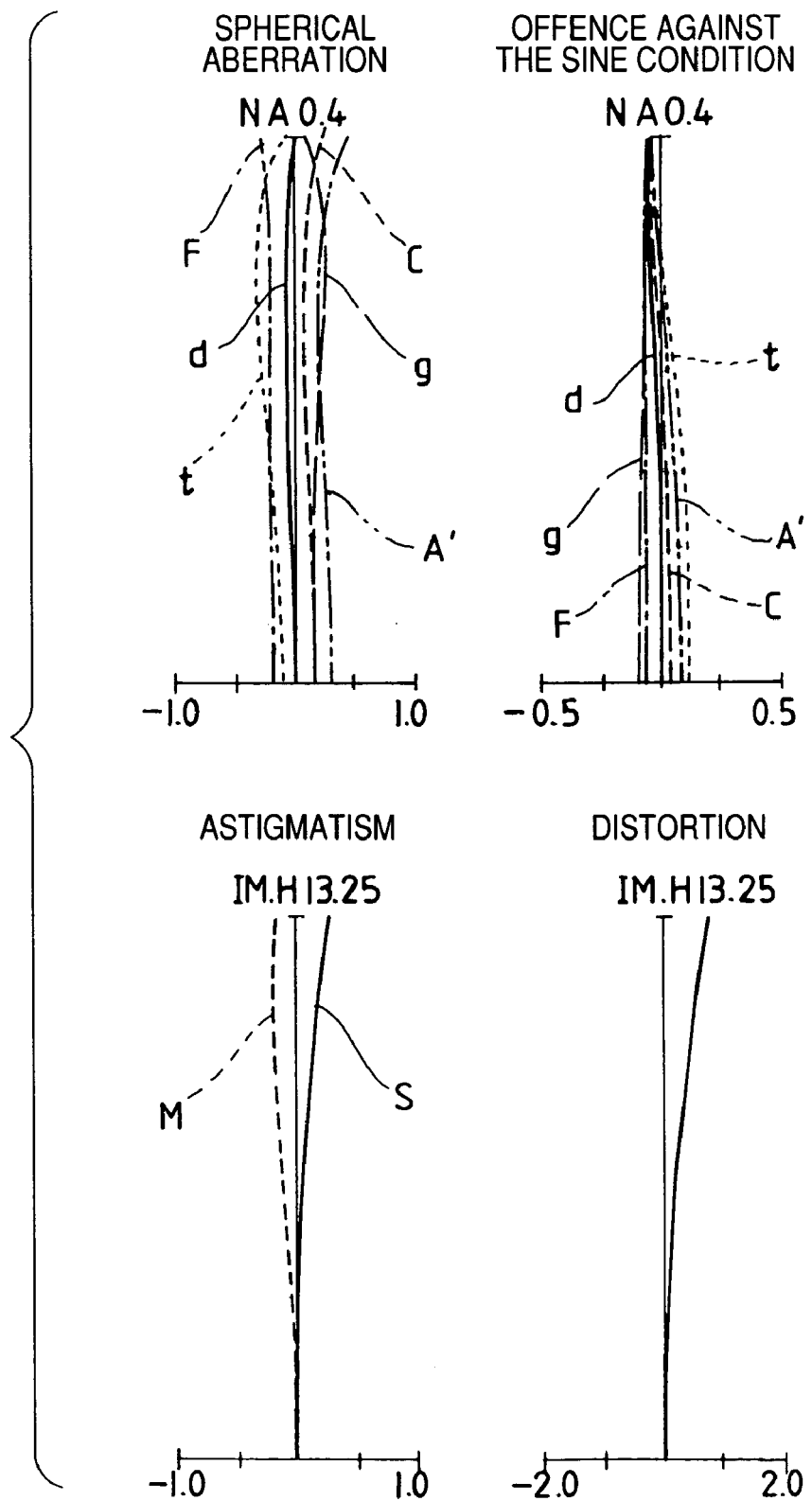
FIG. 10 is a diagram showing aberration curves of the fifth embodiment of the present invention.

An objective lens system according to a fifth embodiment of the present invention has the first composition shown in FIG. 5, and consists of a first lens unit G1 and a second lens unit G2.

The first lens unit G1, consists, in order from the object side, of a cemented lens component ($r_1$ to $r_3$) which consists of a negative lens element ($r_1$ to $r_2$) and a positive lens element ($r_2$ to $r_3$), a positive lens element ($r_4$ to $r_5$), a positive lens element ($r_6$ to $r_7$), and a cemented lens component L1 ($r_8$ to $r_{10}$) which consists of a positive lens element L1p ($r_8$ to $r_9$) and a negative lens element L1n ($r_9$ to $r_{10}$) have a concave surface on the image side. Furthermore, the second lens unit G2 consists, in order from the object side, of a cemented lens component L2 ($r_{11}$ to $r_{13}$) which consists of a negative lens element L2n ($r_{11}$ to $r_{12}$) having a concave surface on the object side and a positive lens element L2p ($r_{12}$ to $r_{13}$), and a positive lens element ($r_{14}$ to $r_{15}$).

The fifth embodiment has numerical data which is listed below:

| f = 18, β = 10x, NA = 0.4, field number = 26.5, WD = 3.949 | | | |
|---|---|---|---|
| $r_1 = -5.9965$ | $d_1 = 2.9820$ | $n_1 = 1.67300$ | $\nu_1 = 38.15$ |
| $r_2 = 71.8587$ | $d_2 = 3.0905$ | $n_2 = 1.49700$ | $\nu_2 = 81.54$ |
| $r_3 = -7.1299$ | $d_3 = 0.2125$ | | |
| $r_4 = 177.0850$ | $d_4 = 4.1851$ | $n_3 = 1.56907$ | $\nu_3 = 71.30$ |
| $r_5 = -18.9259$ | $d_5 = 1.1100$ | | |
| $r_6 = 11.1707$ | $d_6 = 3.6235$ | $n_4 = 1.43875$ | $\nu_4 = 94.93$ |
| $r_7 = \infty$ | $d_7 = 5.4744$ | | |
| $r_8 = 9.3475$ | $d_8 = 3.6935$ | $n_5 = 1.43875$ | $\nu_5 = 94.93$ |

-continued

| f = 18, β = 10x, NA = 0.4, field number = 26.5, WD = 3.949 | | | |
|---|---|---|---|
| $r_9 = -10.9268$ | $d_9 = 1.8214$ | $n_6 = 1.55836$ | $\nu_6 = 54.01$ |
| $r_{10} = 7.4855$ | $d_{10} = 5.5110$ | | |
| $r_{11} = -5.4188$ | $d_{11} = 3.5673$ | $n_7 = 1.51633$ | $\nu_7 = 64.14$ |
| $r_{12} = 116.2141$ | $d_{12} = 4.0903$ | $n_8 = 1.43875$ | $\nu_8 = 94.93$ |
| $r_{13} = -10.7940$ | $d_{13} = 0.1300$ | | |
| $r_{14} = \infty$ | $d_{14} = 3.2380$ | $n_9 = 1.49700$ | $\nu_9 = 81.54$ |
| $r_{15} = -17.1112$ | | | |

$\nu_d(L1p) = 94.93$
$\nu_d(L1n) = 54.01$
$\nu_d(L2p) = 94.93$
$\nu_d(L2n) = 64.14$
$\theta Ct(L2p) = 0.8373$
$\theta Ct(L2n) = 0.8687$
$f(L2) = -28.379$
$f = 18$
(1) $\nu_d(L1p) - \nu_d(L1n) = 40.92$
(2) $\nu_d(L2p) = 94.93$
(3) $\{\theta Ct(L2p) - \theta Ct(L2n)\}/\{\nu_d(L2p) - \nu_d(L2n)\} = -0.001$
(4) $f = 18$
(5) $|f(L2)/f| = 1.58$
(6) $\nu_d(L1p) = 94.93$ As shown in the numerical data, each of the first, second, third, fourth and fifth embodiments described above satisfies all the conditions (1), (2), (3), (4), (5) and (6).

Furthermore, each of the objective lens system according to the first, second and third embodiments has a magnification of 4× and an NA of 0.16. The objective lens systems according to the fourth and fifth embodiments have a magnification of 10× and an NA of 0.4.

The objective lens system according to the fifth embodiment is also made of a glass material which is characterized by excellent transmittance in the ultraviolet region and little emission of auto-fluorescence, and has a composition suited to fluorescence observation.

A cover glass plate used in each of the first through fifth embodiments has a thickness of 0.17 mm, a refractive index of 1.521 for the d-line and an Abbe's number of 56.02 for the d-line.

Figure 17:
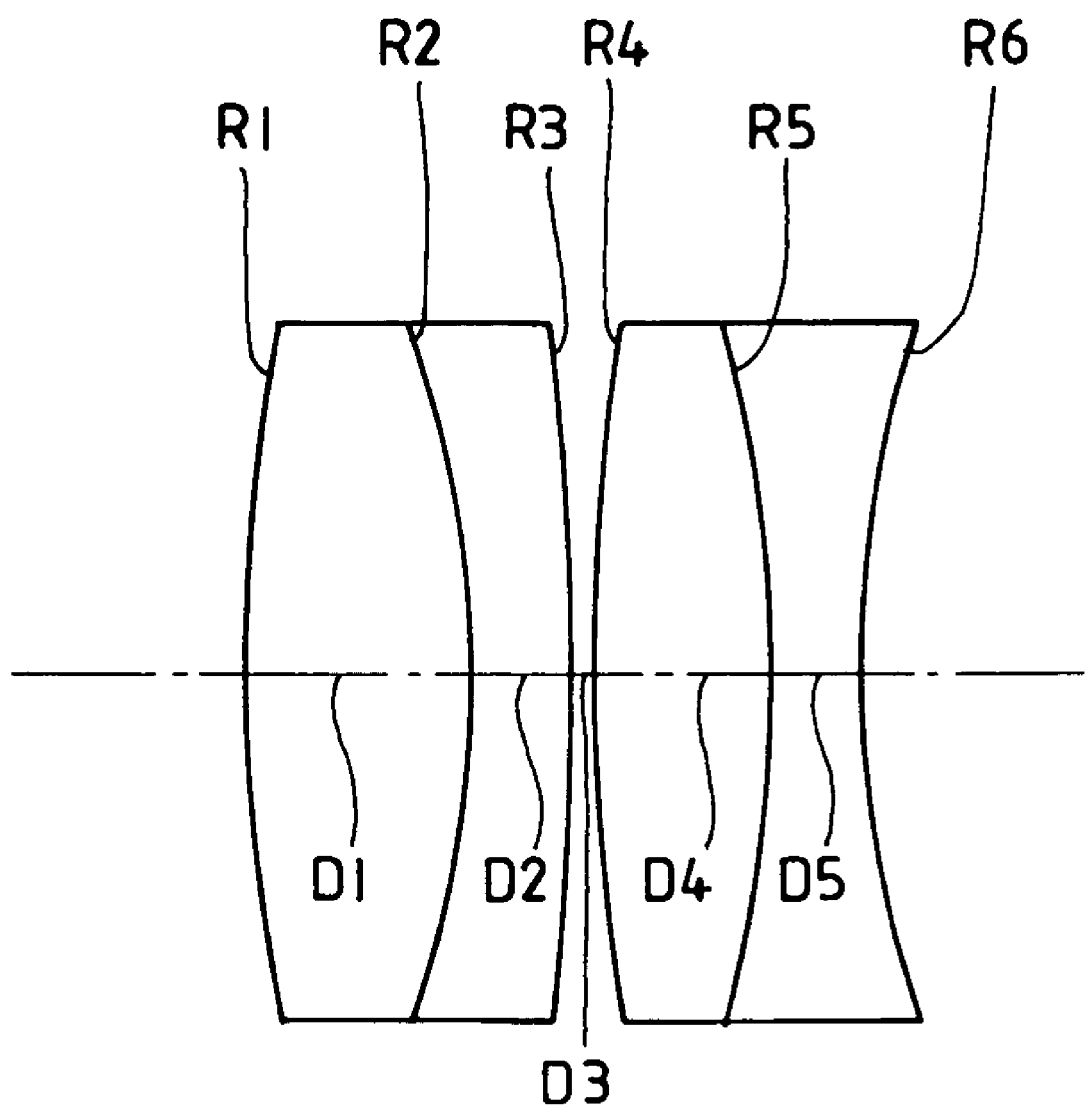
FIG. 17 is a sectional view showing a composition of an example of imaging lens system to be used with the objective lens system according to the present invention.

Each of the objective lens systems according to the first through fifth embodiments allows a parallel light bundle to be emerged from the objective lens system, has aberrations corrected for an infinite distance and forms no image by itself. Accordingly, the objective lens system is used in combination with an imaging lens system which has a composition, for example, shown in FIG. 17 and the numerical data listed below:

| F = 180 | | | |
|---|---|---|---|
| $R_1 = 68.7541$ | $D_1 = 7.7321$ | $N_1 = 1.48749$ | $V_1 = 70.20$ |
| $R_2 = -37.5679$ | $D_2 = 3.4742$ | $N_2 = 1.80610$ | $V_2 = 40.95$ |
| $R_3 = -102.8477$ | $D_3 = 0.6973$ | | |
| $R_4 = 84.3099$ | $D_4 = 6.0238$ | $N_3 = 1.83400$ | $V_3 = 37.16$ |
| $R_5 = -50.7100$ | $D_5 = 3.0298$ | $N_4 = 1.64450$ | $V_4 = 40.82$ |
| $R_6 = 40.6619$ | | | | wherein the reference symbols $R_1$, $R_2$, ... and $R_6$ represent radii of curvature on surfaces of respective lens elements of the imaging lens system, the reference symbols $D_1$, $D_2$, ... and $D_5$ designate thicknesses of the respective lens elements of the imaging lens system and airspaces reserved therebetween, the reference symbols $N_1$, $N_2$, $N_3$, and $N_4$ denote refractive indices refractive indices of the respective lens element of the imaging lens system, the reference symbols $V_1$, $V_2$, $V_3$, and $V_4$, represent Abbe's numbers of the respective lens element of the imaging lens system, and a reference symbol F designates a focal length of the imaging lens system.

When this imaging lens system is to be used in combination with the objective lens systems according to each embodiment, the imaging lens system is to be disposed so as to reserve a distance of 50 mm to 170 mm between the objective lens system and the imaging lens system.

FIGS. 6, 7, 8, 9 and 10 show aberrations confirmed in conditions where the above described imaging lens system is combined with the objective lens systems according to the first, second, third, fourth and fifth embodiments with a distance of 120 mm reserved between the imaging lens system and each objective lens system.

As apparent from these aberrations, not only chromatic aberration but also other aberrations are favorably corrected in each of the objective lens systems according to the embodiments.

Furthermore, the objective lens system according to the present invention has a large numerical aperture and forms a bright image with high resolution as compared with the conventional objective lens system such as those disclosed by the above-mentioned literatures which are usable at wavelengths from the visible region to the near infrared region and have magnifications on the similar orders.

Figure 11:
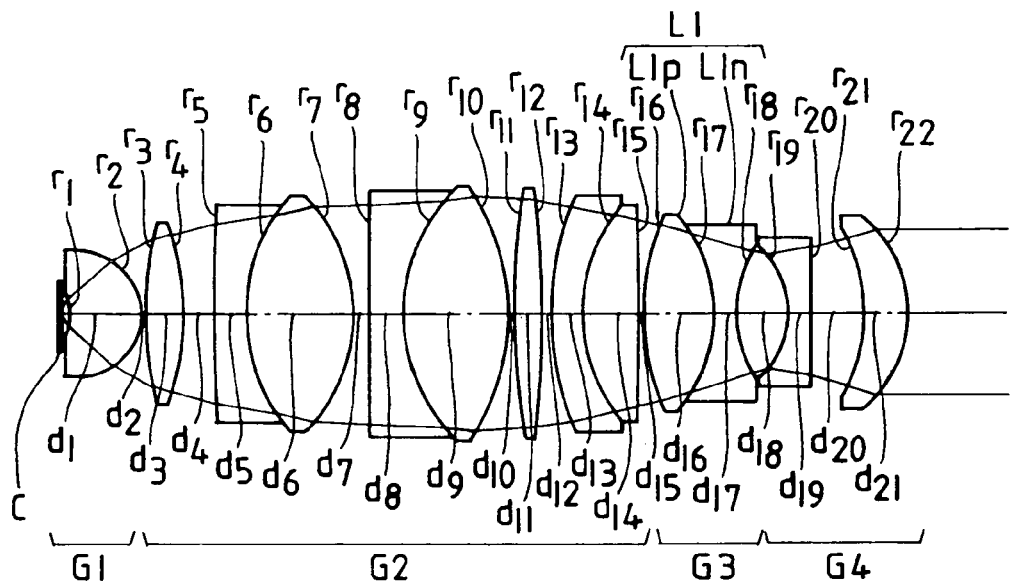
FIG. 11 is a sectional view showing a composition of an objective lens system according to an sixth embodiment of the present invention which has a second composition.

An objective lens system for microscope according to a sixth embodiment has a second composition shown in FIG. 11.

Speaking concretely, the objective lens system according to the sixth embodiment consists, in order from the object side, of a first lens unit ($r_1$ to $r_2$) which consists of a positive lens element ($r_1$ to $r_2$) having a concave surface on the object side, a second lens unit G2 which consists of a positive lens element ($r_3$ to $r_4$), a cemented lens component ($r_5$ to $r_7$), a cemented lens component ($r_8$ to $r_{10}$), a positive element ($r_{11}$ to $r_{12}$) and a cemented lens component ($r_{13}$ to $r_{15}$), a third lens unit G3 which consists of a cemented lens component L1 consisting of a positive lens element L1p ($r_{16}$ to $r_{17}$) and a negative lens element L1n ($r_{17}$ to $r_{18}$) having a concave surface on the image side, and a fourth lens unit G4 ($r_{19}$ to $r_{22}$) which consists of a negative lens element ($r_{19}$ to $r_{20}$) and a positive meniscus lens element ($r_{21}$ to $r_{22}$).

The sixth embodiment has numerical data which is listed below:

| f = 4.5, β = 40x, NA = 0.9, field number = 26.5, WD = 0.4 | | | |
|---|---|---|---|
| $r_1$ = −2.4258 | $d_1$ = 3.3998 | $n_1$ = 1.75500 | $v_1$ = 52.32 |
| $r_2$ = −3.0554 | $d_2$ = 0.1440 | | |
| $r_3$ = 19.0258 | $d_3$ = 1.7643 | $n_2$ = 1.43875 | $v_2$ = 94.93 |
| $r_4$ = −14.6149 | $d_4$ = 1.4500 | | |
| $r_5$ = 98.6582 | $d_5$ = 1.5000 | $n_3$ = 1.61336 | $v_3$ = 44.49 |
| $r_6$ = 9.5704 | $d_6$ = 4.9892 | $n_4$ = 1.43875 | $v_4$ = 94.93 |
| $r_7$ = −8.6960 | $d_7$ = 0.7549 | | |
| $r_8$ = ∞ | $d_8$ = 1.6500 | $n_5$ = 1.61336 | $v_5$ = 44.49 |
| $r_9$ = 9.0817 | $d_9$ = 4.9932 | $n_6$ = 1.43875 | $v_6$ = 94.93 |
| $r_{10}$ = −11.3411 | $d_{10}$ = 0.3034 | | |
| $r_{11}$ = 43.4784 | $d_{11}$ = 1.3013 | $n_7$ = 1.43875 | $v_7$ = 94.93 |
| $r_{12}$ = −53.3240 | $d_{12}$ = 0.4450 | | |
| $r_{13}$ = 15.3649 | $d_{13}$ = 1.5000 | $n_8$ = 1.61336 | $v_8$ = 44.49 |
| $r_{14}$ = 8.8689 | $d_{14}$ = 2.5874 | $n_9$ = 1.43875 | $v_9$ = 94.93 |
| $r_{15}$ = −265.4354 | $d_{15}$ = 0.2546 | | |
| $r_{16}$ = 13.1997 | $d_{16}$ = 3.2789 | $n_{10}$ = 1.49700 | $v_{10}$ = 81.54 |
| $r_{17}$ = −7.6651 | $d_{17}$ = 1.0000 | $n_{11}$ = 1.48749 | $v_{11}$ = 70.23 |

-continued

| f = 4.5, β = 40x, NA = 0.9, field number = 26.5, WD = 0.4 | | | |
|---|---|---|---|
| $r_{18}$ = 6.6201 | $d_{18}$ = 2.5000 | | |
| $r_{19}$ = −4.5365 | $d_{19}$ = 1.0000 | $n_{12}$ = 1.61336 | $v_{12}$ = 44.49 |
| $r_{20}$ = ∞ | $d_{20}$ = 2.5333 | | |
| $r_{21}$ = −8.9090 | $d_{21}$ = 2.1500 | $n_{13}$ = 1.73800 | $v_{13}$ = 32.26 |
| $r_{22}$ = −6.2338 | | | |

$v_d$(L1p) = 81.54
$v_d$(L1n) = 70.23
θCt(L1p) = 0.8258
θCt(L1n) = 0.8924
f(G1) = 11.784
f = 4.5
$v_{d, ave}$(G2p) = 94.93
$v_{d, ave}$(G2n) = 44.49
$v_d$(G4p) = 32.26
(7) $v_d$(L1p) = 81.54
(8) {θCt(L1p) − θCt(L1n)}/{$v_d$(L1p) − $v_d$(L1n)} = −0.0059
(9) f(G1)/f = 2.62
(10) f = 4.5
(11) $v_{d, ave}$(G2p) − $v_{d, ave}$(G2n) = 50.44
(12) $v_{d, ave}$(G2p) = 94.93
(13) $v_d$(G4p) = 32.26 wherein the reference symbols $r_1$, $r_2$, . . . represent radii of curvature on surfaces of respective lens elements, the reference symbols $d_1$, $d_2$, . . . designate thicknesses of the respective lens elements and airspace reserved therebetween, the reference symbols $n_1$, $n_2$, . . . denote refractive indices of the respective lens element for the d-line, and the reference symbols $v_1$, $v_2$, . . . represent Abbe's number of the respective lens elements for the d-line. In addition, length such as r and d are specified in a unit of millimeter.

Used in this sixth embodiment is a glass material which is characterized by excellent transmittance in the ultraviolet region and little emission of auto-fluorescence. Accordingly the objective lens system according to the sixth embodiment has a composition optimum for fluorescence observation.

Figure 12:
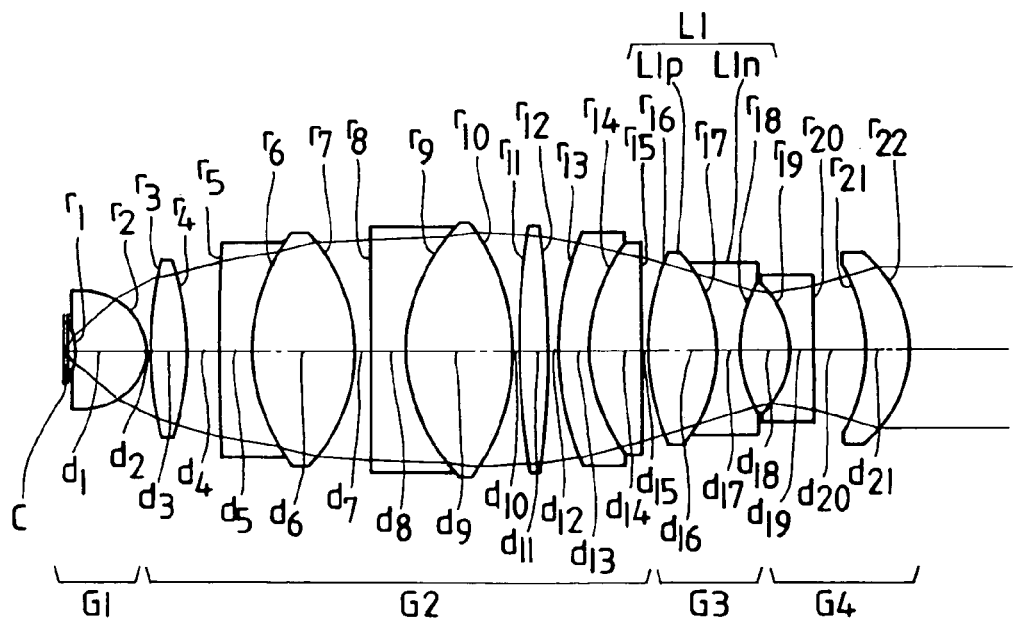
FIG. 12 is a sectional view showing a composition of an objective lens system according to a seventh embodiment of the present invention which has the second composition.

An objective lens system according to a seventh embodiment of the present invention has the second composition shown in FIG. 12 which is similar to that of the sixth embodiment.

Speaking concretely, the objective lens system according to the seventh embodiment consists, in order from the object side, of a first lens unit G1 which consists of a positive lens element ($r_1$ to $r_2$) having a concave surface on the object side, positive lens element ($r_3$ to $r_4$), a second lens unit G2 which consists of a cemented lens component ($r_5$ to $r_7$) which consists of a negative lens element ($r_5$ to $r_6$) and a positive lens element ($r_6$ to $r_7$), a cemented lens component ($r_8$ to $r_{10}$) which consists of a negative lens element ($r_8$ to $r_9$) and a positive lens element ($r_9$ to $r_{10}$), a positive lens element ($r_{11}$ to $r_{12}$), a cemented lens component ($r_{13}$ to $r_{15}$) which consists of a negative meniscus lens element ($r_{13}$ to $r_{14}$) and a positive lens element ($r_{14}$ to $r_{15}$), a third lens unit G3 which consists of a cemented lens component L1 ($r_{16}$ to $r_{18}$) which consists of a positive lens element L1p ($r_{16}$ to $r_{17}$) and a negative lens element L1n ($r_{17}$ to $r_{18}$), and a fourth lens unit G4 which consists of a negative lens element ($r_{19}$ to $r_{20}$) and a positive meniscus lens element ($r_{21}$ to $r_{22}$).

| $f = 4.5$, $\beta = 40x$, NA = 0.9, field number = 26.5, WD = 0.4 | | | |
|---|---|---|---|
| $r_1 = -2.4507$ | $d_1 = 3.3854$ | $n_1 = 1.75500$ | $\nu_1 = 52.32$ |
| $r_2 = -3.0451$ | $d_2 = 0.1440$ | | |
| $r_3 = 19.1818$ | $d_3 = 1.7157$ | $n_2 = 1.43875$ | $\nu_2 = 94.93$ |
| $r_4 = -15.4123$ | $d_4 = 1.5000$ | | |
| $r_5 = 110.5711$ | $d_5 = 1.5000$ | $n_3 = 1.61336$ | $\nu_3 = 44.49$ |
| $r_6 = 9.8202$ | $d_6 = 4.9260$ | $n_4 = 1.43875$ | $\nu_4 = 94.93$ |
| $r_7 = -8.7137$ | $d_7 = 0.7549$ | | |
| $r_8 = \infty$ | $d_8 = 1.6500$ | $n_5 = 1.61336$ | $\nu_5 = 44.49$ |
| $r_9 = 9.1509$ | $d_9 = 5.0836$ | $n_6 = 1.43875$ | $\nu_6 = 94.93$ |
| $r_{10} = -11.0503$ | $d_{10} = 0.3034$ | | |
| $r_{11} = 41.6145$ | $d_{11} = 1.3951$ | $n_7 = 1.43875$ | $\nu_7 = 94.93$ |
| $r_{12} = -45.9757$ | $d_{12} = 0.4450$ | | |
| $r_{13} = 15.5065$ | $d_{13} = 1.5000$ | $n_8 = 1.61336$ | $\nu_8 = 44.49$ |
| $r_{14} = 9.2864$ | $d_{14} = 2.4509$ | $n_9 = 1.43875$ | $\nu_9 = 94.93$ |
| $r_{15} = \infty$ | $d_{15} = 0.2546$ | | |
| $r_{16} = 12.1180$ | $d_{16} = 3.2775$ | $n_{10} = 1.49700$ | $\nu_{10} = 81.54$ |
| $r_{17} = -7.8019$ | $d_{17} = 1.0000$ | $n_{11} = 1.51633$ | $\nu_{11} = 64.14$ |
| $r_{18} = 6.4412$ | $d_{18} = 2.5000$ | | |
| $r_{19} = -4.5107$ | $d_{19} = 1.0000$ | $n_{12} = 1.61336$ | $\nu_{12} = 44.49$ |
| $r_{20} = \infty$ | $d_{20} = 2.4370$ | | |
| $r_{21} = -8.9051$ | $d_{21} = 2.1500$ | $n_{13} = 1.73800$ | $\nu_{13} = 32.26$ |
| $r_{22} = -6.1329$ | | | |

$\nu_d(L1p) = 81.54$
$\nu_d(L1n) = 64.14$
$\theta Ct(L1p) = 0.8258$
$\theta Ct(L1n) = 0.8687$
$f(G1) = 11.467$
$f = 4.5$
$\nu_{d, ave}(G2p) = 94.93$
$\nu_{d, ave}(G2n) = 44.49$
$\nu_d(G4p) = 32.26$
(7) $\nu_d(L1p) = 81.54$
(8) $\{\theta Ct(L1p) - \theta Ct(L1n)\}/\{\nu_d(L1p) - \nu_d(L1n)\} = -0.0025$
(9) $f(G1)/f = 2.55$
(10) $f = 4.5$
(11) $\nu_{d, ave}(G2p) - \nu_{d, ave}(G2n) = 50.44$
(12) $\nu_{d, ave}(G2p) = 94.93$
(13) $\nu_d(G4p) = 32.26$ A glass material used in the seventh embodiment is also characterized by excellent transmittance in the ultraviolet region and little emission of auto-fluorescence.

Accordingly, the seventh embodiment provides an objective lens system optimum for fluorescence observation.

Figure 13:
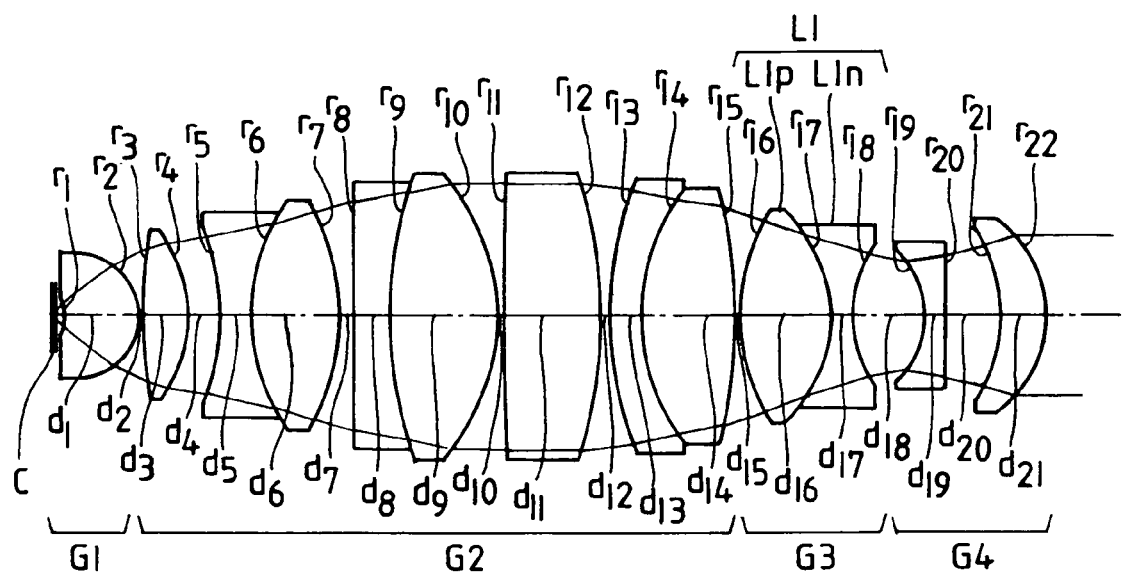
FIG. 13 is a sectional view showing a composition of an objective lens system according to a eighth embodiment of the present invention which has the second composition.

An objective lens system according to an eighth embodiment of the present invention has the second composition shown in FIG. 13 which is similar to that of the objective lens system according to the sixth embodiment.

Speaking concretely, the objective lens system according to the eighth embodiment consists, in order from the object side, of a first lens unit G1 which consists of a positive lens element ($r_1$ to $r_2$), a second lens unit G2 which consists of a positive lens element ($r_3$ to $r_4$), a cemented lens component ($r_5$ to $r_7$), a cemented lens component ($r_8$ to $r_{10}$), a positive lens element ($r_{11}$ to $r_{12}$) and a cemented lens component ($r_{13}$ to $r_{15}$), a third lens unit G3 which consists of a cemented lens component L1 ($r_{16}$ to $r_{18}$) which consists of a positive lens element LP1 ($r_{16}$ to $r_{17}$) and a negative lens element L1n ($r_{17}$ to $r_{18}$) having a concave surface on the image side, and a fourth lens unit G4 which consists of a negative lens element ($r_{19}$ to $r_{20}$) and a positive meniscus lens element ($r_{21}$ to $r_{22}$).

The eighth embodiment has numerical data which is listed below:

| $f = 4.5$, $\beta = 40x$, NA = 0.9, field number = 26.5, WD = 0.35 | | | |
|---|---|---|---|
| $r_1 = -2.7877$ | $d_1 = 3.6194$ | $n_1 = 1.75500$ | $\nu_1 = 52.32$ |
| $r_2 = -3.1784$ | $d_2 = 0.1440$ | | |
| $r_3 = 24.3523$ | $d_3 = 2.1594$ | $n_2 = 1.43875$ | $\nu_2 = 94.93$ |
| $r_4 = -7.4618$ | $d_4 = 1.5000$ | | |
| $r_5 = -12.9699$ | $d_5 = 1.5000$ | $n_3 = 1.61336$ | $\nu_3 = 44.49$ |
| $r_6 = 10.2384$ | $d_6 = 4.0803$ | $n_4 = 1.43875$ | $\nu_4 = 94.93$ |
| $r_7 = -12.4906$ | $d_7 = 0.7549$ | | |
| $r_8 = \infty$ | $d_8 = 1.6500$ | $n_5 = 1.61336$ | $\nu_5 = 44.49$ |
| $r_9 = 22.2287$ | $d_9 = 5.1206$ | $n_6 = 1.43875$ | $\nu_6 = 94.93$ |
| $r_{10} = -11.0409$ | $d_{10} = 0.3034$ | | |
| $r_{11} = 213.8028$ | $d_{11} = 4.5976$ | $n_7 = 1.43875$ | $\nu_7 = 94.93$ |
| $r_{12} = -23.7385$ | $d_{12} = 0.4450$ | | |
| $r_{13} = 19.0260$ | $d_{13} = 1.5000$ | $n_8 = 1.61336$ | $\nu_8 = 44.49$ |
| $r_{14} = 10.8403$ | $d_{14} = 4.4434$ | $n_9 = 1.43875$ | $\nu_9 = 94.93$ |
| $r_{15} = -29.6553$ | $d_{15} = 0.2546$ | | |
| $r_{16} = 10.2000$ | $d_{16} = 4.2897$ | $n_{10} = 1.43875$ | $\nu_{10} = 94.93$ |
| $r_{17} = -7.5925$ | $d_{17} = 1.0000$ | $n_{11} = 1.51633$ | $\nu_{11} = 64.14$ |
| $r_{18} = 6.1718$ | $d_{18} = 3.4508$ | | |
| $r_{19} = -4.7034$ | $d_{19} = 1.0000$ | $n_{12} = 1.61336$ | $\nu_{12} = 44.49$ |
| $r_{20} = \infty$ | $d_{20} = 2.6201$ | | |
| $r_{21} = -8.3897$ | $d_{21} = 2.1500$ | $n_{13} = 1.73800$ | $\nu_{13} = 32.26$ |
| $r_{22} = -6.1280$ | | | |

$\nu_d(L1p) = 94.93$
$\nu_d(L1n) = 64.14$
$\theta Ct(L1p) = 0.8373$
$\theta Ct(L1n) = 0.8687$
$f(G1) = 10.061$
$f = 4.5$
$\nu_{d, ave}(G2p) = 94.93$
$\nu_{d, ave}(G2n) = 44.49$
$\nu_d(G4p) = 32.26$
(7) $\nu_d(L1p) = 94.93$
(8) $\{\theta Ct(L1p) - \theta Ct(L1n)\}/\{\nu_d(L1p) - \nu_d(L1n)\} = -0.001$
(9) $f(G1)/f = 2.24$
(10) $f = 4.5$
(11) $\nu_{d, ave}(G2p) - \nu_{d, ave}(G2n) = 50.44$
(12) $\nu_{d, ave}(G2p) = 94.93$
(13) $\nu_d(G4p) = 32.26$ The objective lens system according to the eighth embodiment is made of a glass material which is excellent in transmittance in the ultraviolet region and emits little auto-fluorescence, thereby being optimum for fluorescence observation.

Each of the above described sixth, seventh and eighth embodiments satisfies all the conditions (7), (8), (9), (10), (11), (12) and (13) as clarified by the numerical data.

Furthermore, each of the objective lens system according to the sixth, seventh and eighth embodiments has a magnification $\beta$ of 40x and a large numerical aperture of 0.9.

Each of the above described objective lens system according to the sixth, seventh and eighth embodiments allows a parallel light bundle to be emerged and forms no image by itself. The objective lens system is therefore used in combination with an imaging lens system which has the following numerical data.

| $F = 180$ | | | |
|---|---|---|---|
| $R_1 = 68.7541$ | $D_1 = 7.7321$ | $N_1 = 1.48749$ | $V_1 = 70.20$ |
| $R_2 = -37.5679$ | $D_2 = 3.4742$ | $N_2 = 1.80610$ | $V_2 = 40.95$ |
| $R_3 = -102.8477$ | $D_3 = 0.6973$ | | |
| $R_4 = 84.3099$ | $D_4 = 6.0238$ | $N_3 = 1.83400$ | $V_3 = 37.16$ |
| $R_5 = -50.7100$ | $D_5 = 3.0298$ | $N_4 = 1.64450$ | $V_4 = 40.82$ |
| $R_6 = 40.6619$ | | | | wherein the reference symbols $R_1, R_2, \ldots$ and $R_6$ represent radii of curvature on surfaces of respective lens elements of the imaging lens system, the reference symbols $D_1, D_2, \ldots$ and $D_5$ designate thicknesses of the respective lens elements of the imaging lens system and airspaces reserved therebetween the reference symbols $N_1, N_2, N_3$ and $N_4$ denote refractive indices of the respective lens elements of the imaging lens system, the reference symbols $V_1, V_2, V_3$ and $V_4$ represent Abbe's numbers of the respective lens elements of the imaging lens system, and the reference symbol F designates a focal length of the imaging lens system.

When this imaging lens system is to be used in combination the objective lens system according to each of the embodiments, the imaging lens system is to be disposed with a distance of 50 mm to 170 mm between the objective lens system and the imaging lens system.

Figure 14:
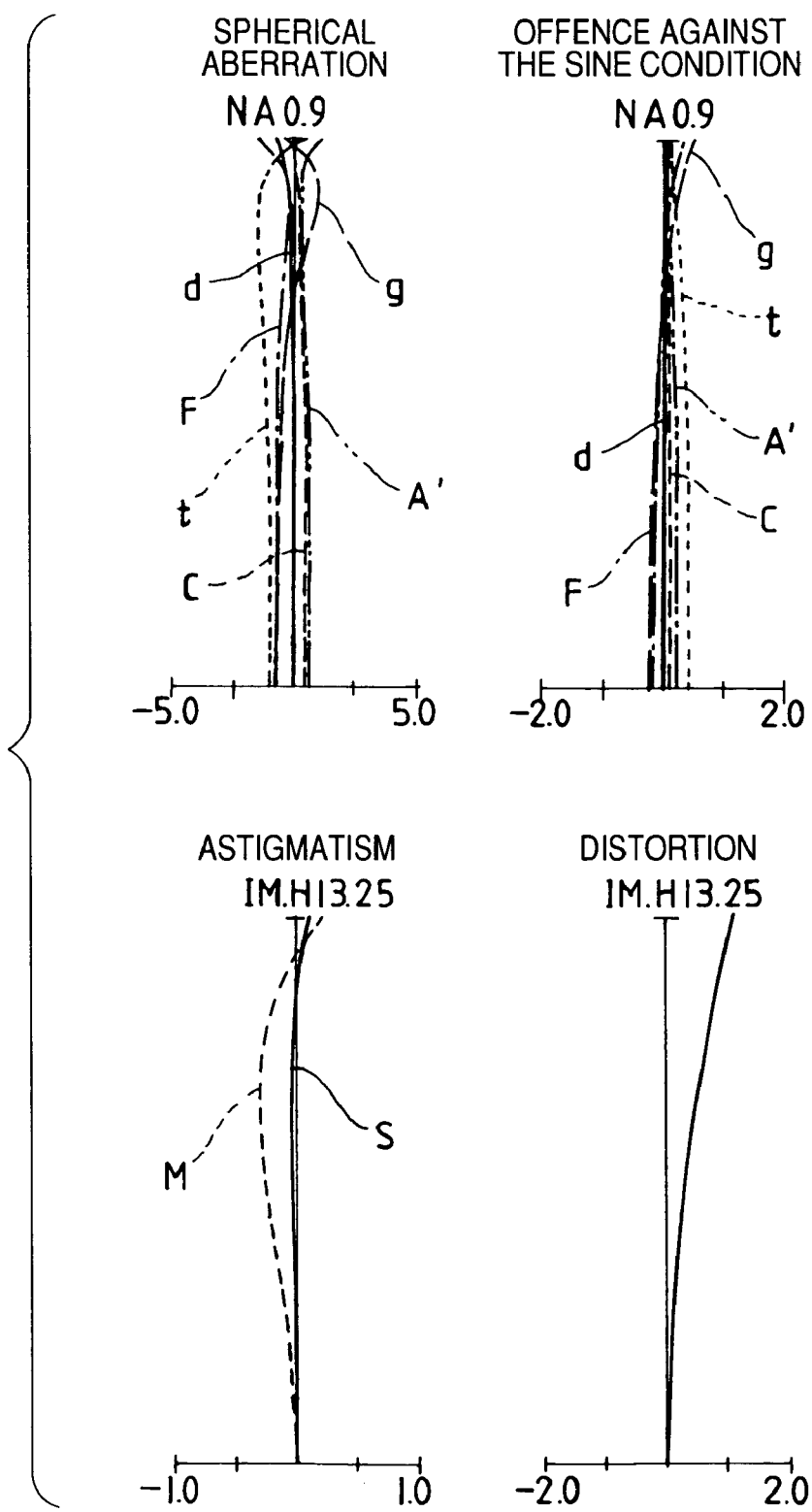
FIG. 14 is a diagram showing aberration curves of the sixth embodiment of the present invention.
Figure 15:
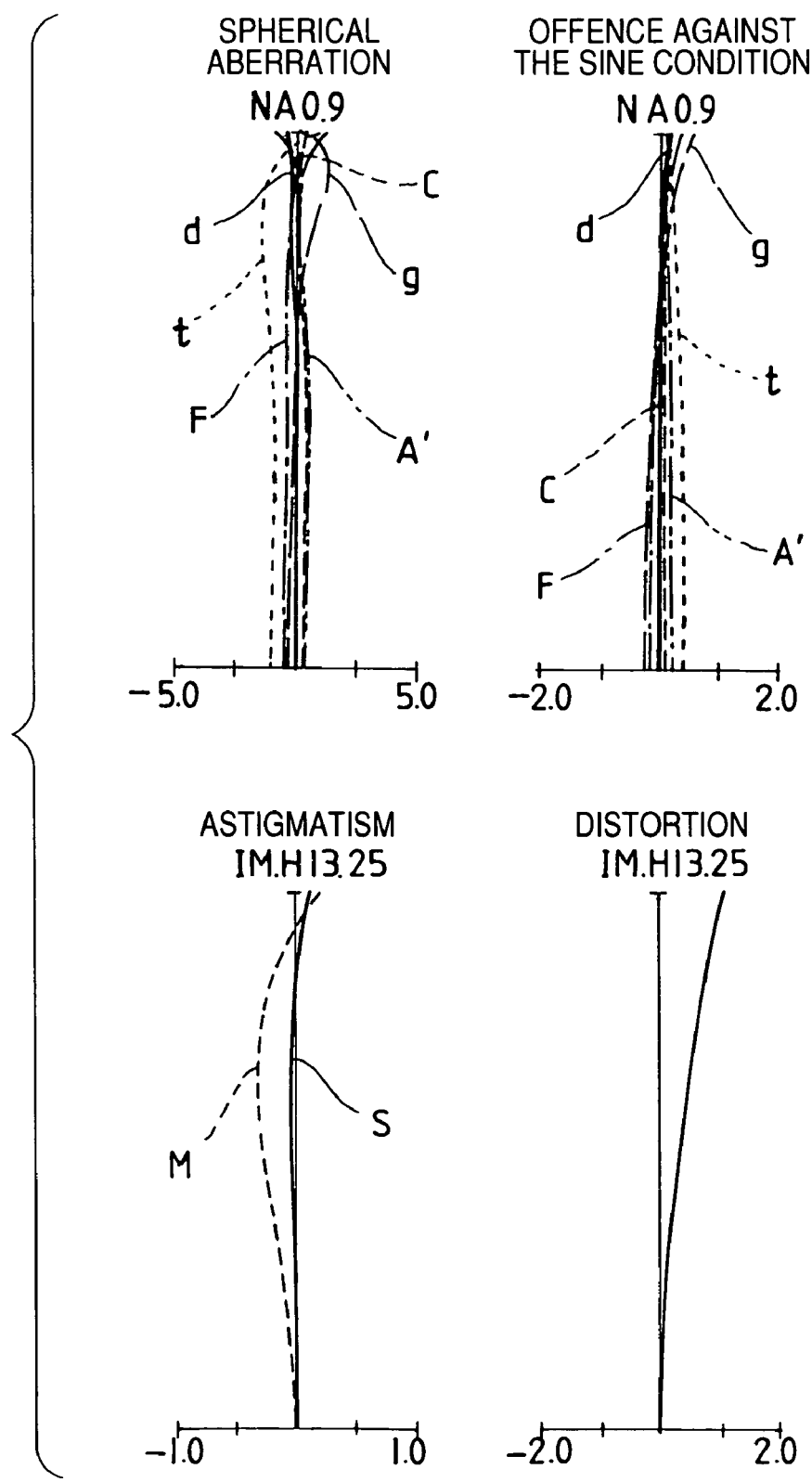
FIG. 15 is a diagram showing aberration curves of the seventh embodiment of the present invention.
Figure 16:
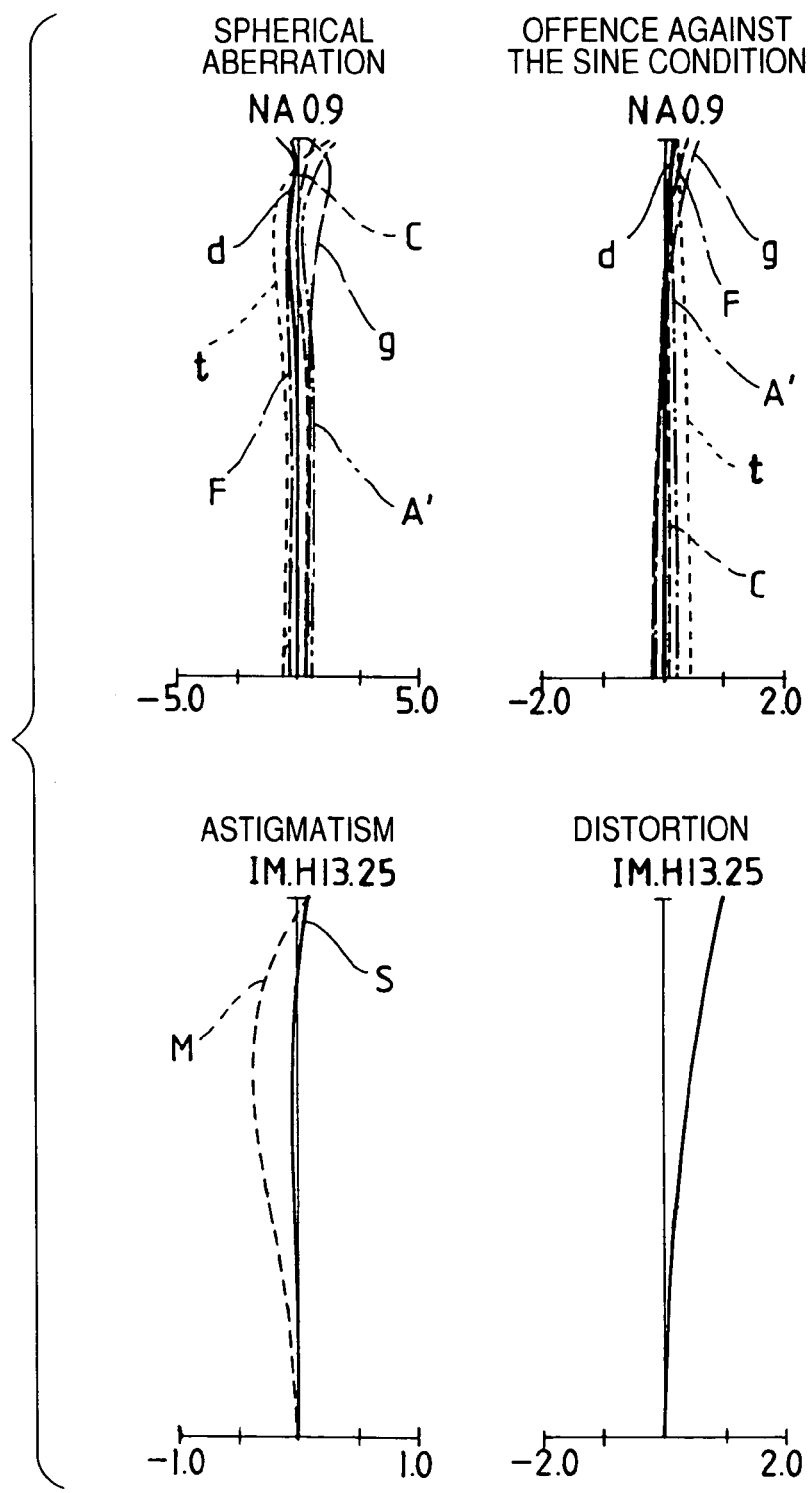
FIG. 16 is a diagram showing aberration curves of the eighth embodiment of the present invention.

Aberrations in a condition where the imaging lens system is disposed at a distance of 120 mm from the objective lens systems according to the sixth, seventh and eighth embodiment are shown in FIGS. 14, 15 and 16 respectively.

As shown in these drawings, chromatic aberration and other aberrations are favorably corrected in the objective lens systems according to the sixth, seventh and eighth embodiments.

Furthermore, the objective lens system according to the present invention is usable in a wavelength range from the visible region to the near infrared region like the above described conventional objective lens systems, and has a large NA of 0.9 and providing a bright image with high resolution.

The objective lens system according to the present invention which is to be used for fluorescence observation, DIC observation and the like has a magnification on the order of 40× and aberrations favorably corrected within a range from the visible region to the near infrared region. Moreover, the objective lens system according to the present invention has a large NA and is therefore suited to observation of cells, proteins and DNAs.

The invention claimed is:

1. An objective lens system for microscope comprising: a first lens unit comprising at least a cemented lens component;

and a second lens unit comprising at least a cemented lens component, wherein the cemented lens component in said first lens unit consists of a positive lens element and a negative lens element having a concave surface on the image side, wherein the cemented lens component in the second lens unit consists of a negative lens element having a concave surface on the object side and a positive lens element, and wherein said objective lens system satisfies the following conditions (1), (2), (3), (4) and (5):

$$v_d(L1p) - v_d(L1n) > 20 \tag{1}$$

$$v_d(L2p) > 75 \tag{2}$$

$$-0.007 < \{\theta Ct(L2p) - \theta Ct(L2n)\}/\{v_d(L2p) - v_d(L2n)\} < 0 \tag{3}$$

$$15 < f < 55 \tag{4}$$

$$|f(L2)|/f < 4 \tag{5}$$

wherein the reference symbol $v_d(L1p)$ represents an Abbe's number for the d-line of the positive lens element of the cemented lens component in said first lens unit, the reference symbol $v_d(L1n)$ designates an Abbe's number for the d-line of the negative lens element having the concave surface on the image side of the cemented lens component in said first lens unit, the reference symbol $V_d(L2p)$ denotes an Abbe's number for the d-line of the positive lens element of the cemented lens component in said second lens unit, the reference symbol $V_d(L2n)$ represents an Abbe's number for the d-line of the negative lens element having the concave surface on the object side of the cemented lens component in said second lens unit, the reference symbol $\theta Ct(L2p)$ designates a partial dispersion ratio for the t-line of the positive lens element of the cemented lens component in said second lens unit, the reference symbol $\theta Ct(L2n)$ denotes a partial dispersion ratio for the t-line of the negative lens element having the concave surface on the object side of the cemented lens component in said second lens unit, the reference symbol f(L2) represents a focal length of the cemented lens component in said second lens unit and the reference symbol f designates a focal length of the objective lens system as a whole: the partial dispersion ratio $\theta Ct$ being given by the following equation:

$$\theta Ct = (nC - nt)/(nF - nC).$$

2. The objective lens system for microscope according to claim 1, wherein a diverging light bundle is incident on the cemented lens component in said second lens unit.

3. An objective lens system for microscope according to claim 2, wherein the Abbe's number $vd(L1p)$ of said positive lens element of the cemented lens component in said first lens unit satisfies the following condition (6):

$$v_d(L1p) > 75 \tag{6}$$

4. An optical microscope or an optical apparatus which uses the objective lens system according to claim 2.

5. An objective lens system for microscope according to claim 1, wherein the Abbe's number $vd(L1p)$ of said positive lens element of the cemented lens component in said first lens unit satisfies the following condition (6):

$$v_d(L1p) > 75 \tag{6}$$

6. An optical microscope or an optical apparatus which uses the objective lens system according to claim 5.

7. An optical microscope or an optical apparatus which uses the objective lens system according to claim 1.

8. An objective lens system for microscope comprising in order from the object side: a first lens unit comprising a positive meniscus lens element having a concave surface on the object side;

a second lens unit comprising a plurality of cemented lens components and having positive refractive power;

a third lens unit composed of a cemented lens component which consists of a positive lens element and a negative lens element having a concave surface on the image side;

and a fourth lens unit having negative refractive power, wherein the cemented lens component in said third lens unit satisfies the following conditions (7) and (8):

$$v_d(L1p) > 75 \tag{7}$$

$$-0.007 < \{\theta Ct(L1p) - \theta Ct(L1n)\}/\{v_d(L1p) - v_d(L1n)\} < 0 \tag{8}$$

wherein the reference symbols $v_d(L1p)$ and $v_d(L1n)$ represent Abbe's numbers for the d-line of the positive lens element and the negative lens element having the concave surface on the image side respectively which compose the cemented lens component in said third lens unit, the reference symbols $\theta Ct(L1p)$ and $\theta Ct(L1n)$ designate partial dispersion ratio $\theta Ct$ for the t-line of the positive lens element and the negative lens element having the concave surface on the image side respectively which compose the cemented lens component in said third lens unit: the partial dispersion ratio θct being given by the following equation:

$$\theta Ct = (nC - nt)/(nF - nC).$$

9. The objective lens system according to claim 8 satisfying the following conditions (9), (10), (11) and (12):

$$1 < f(G1)/f < 4 \tag{9}$$

$$2.5 < f < 5.5 \tag{10}$$

$$v_{d,ave}(G2p) - v_{d,ave}(G2n) > 25 \tag{11}$$

$$v_{d,ave}(G2p) > 75 \tag{12}$$

wherein the reference symbol f(G1) represents a focal length of the first lens unit, the reference symbol f designates a focal length of the objective lens system as a whole, the reference symbol $v_{d,ave}(G2p)$ denotes an average value of Abbe's numbers for the d-line of positive lens elements which compose the cemented lens components in the second lens unit and the reference symbol $v_{d,ave}(G2n)$ represents an average value of Abbe's numbers for the d-line of negative lens elements which compose the cemented lens components in the second lens unit.

10. An optical microscope or an optical apparatus which uses the objective lens system according to claim 9.

11. An optical microscope or an optical apparatus which uses the objective lens system according to claim 8.

* * * * *